United States Patent
Kishine et al.

(10) Patent No.: US 12,177,550 B2
(45) Date of Patent: Dec. 24, 2024

(54) LENS DEVICE FOR FORMING IMAGE, AND IMAGING APPARATUS AND IMAGING METHOD WITH LENS DEVICE

(71) Applicant: FUJIFILM Corporation, Tokyo (JP)

(72) Inventors: Yasunobu Kishine, Saitama (JP); Atsushi Kawanago, Saitama (JP); Kazuyoshi Okada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 139 days.

(21) Appl. No.: 18/063,654

(22) Filed: Dec. 8, 2022

(65) Prior Publication Data
US 2023/0103720 A1 Apr. 6, 2023

Related U.S. Application Data

(63) Continuation of application No. PCT/JP2021/024055, filed on Jun. 25, 2021.

(30) Foreign Application Priority Data

Jun. 30, 2020 (JP) ................. 2020-112267

(51) Int. Cl.
*G02B 27/28* (2006.01)
*H04N 23/12* (2023.01)
(Continued)

(52) U.S. Cl.
CPC ........... *H04N 23/55* (2023.01); *G02B 27/286* (2013.01); *G02B 27/288* (2013.01); *H04N 23/12* (2023.01); *H04N 23/56* (2023.01); *H04N 23/74* (2023.01)

(58) Field of Classification Search
CPC ........ H04N 23/55; H04N 23/12; H04N 23/56; H04N 23/74; G02B 27/286; G02B 27/288;
(Continued)

(56) References Cited

U.S. PATENT DOCUMENTS 9,118,796 B2 8/2015 Hiramoto et al.
9,395,516 B2 * 7/2016 Katsunuma ........... G01J 3/2803
(Continued)

FOREIGN PATENT DOCUMENTS

JP H10320538 12/1998
JP 2005243879 9/2005
(Continued)

OTHER PUBLICATIONS

"International Search Report (Form PCT/ISA/210) of PCT/JP2021/024055," mailed on Sep. 7, 2021, with English translation thereof, pp. 1-5.

(Continued)

*Primary Examiner* — Ahmed A Berhan
(74) *Attorney, Agent, or Firm* — JCIPRNET

(57) ABSTRACT

There are provided a lens device, an imaging apparatus, and an imaging method that suppress the occurrence of overexposure by dimming or blocking totally reflected light. The lens device (100) includes: an optical system (100A); a wavelength polarizing filter unit (130) that is disposed at a pupil position of the optical system (100A) or near the pupil position and includes a plurality of aperture regions, a plurality of optical filters that are disposed in the plurality of aperture regions and include two or more optical filters transmitting lights having a part of wavelength ranges different from each other, and a plurality of first polarizing filters that are disposed in the plurality of aperture regions and are at least two first polarizing filters having polarization directions different from each other; and a first circularly polarizing optical element (101) that is provided between a subject and the wavelength polarizing filter unit.

14 Claims, 22 Drawing Sheets

(51) Int. Cl.
*H04N 23/55* (2023.01)
*H04N 23/56* (2023.01)
*H04N 23/74* (2023.01)

(58) Field of Classification Search
CPC .......... G01J 3/0224; G01J 3/2803; G01J 4/04; G03B 11/00; G03B 15/02; G03B 15/05
See application file for complete search history.

(56) References Cited

U.S. PATENT DOCUMENTS 10,088,409 B2    10/2018   Kanamori et al.
10,845,674 B2 *   11/2020   Takigami ................. G03B 9/02
11,733,100 B2 *    8/2023   Miyata ..................... G01J 3/12
                                                                     356/364

FOREIGN PATENT DOCUMENTS

JP        2008020570     1/2008
JP        2018082424     5/2018
WO     2014020791     2/2014

OTHER PUBLICATIONS

"Written Opinion of the International Searching Authority (Form PCT/ISA/237) of PCT/JP2021/024055," mailed on Sep. 7, 2021, with English translation thereof, pp. 1-6.

* cited by examiner

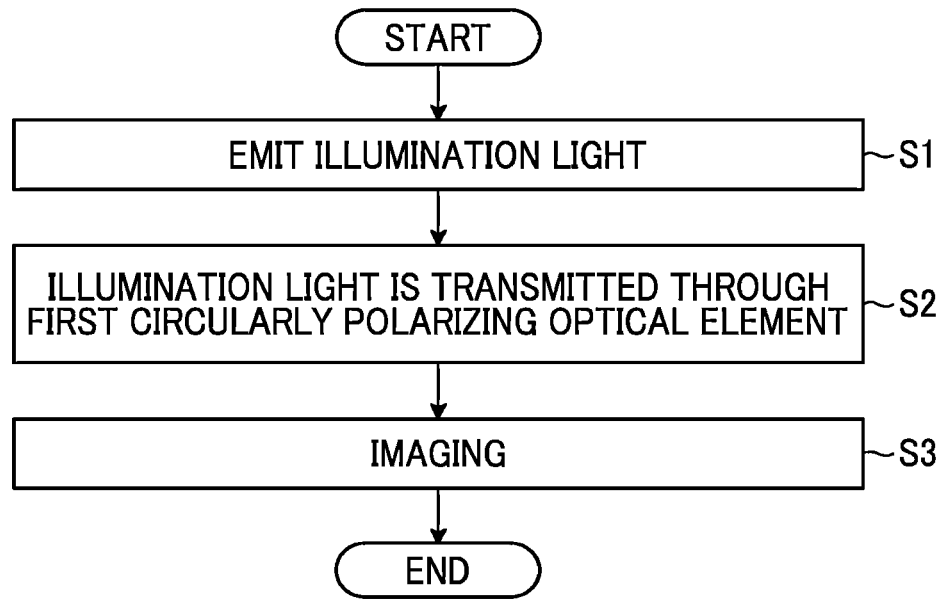
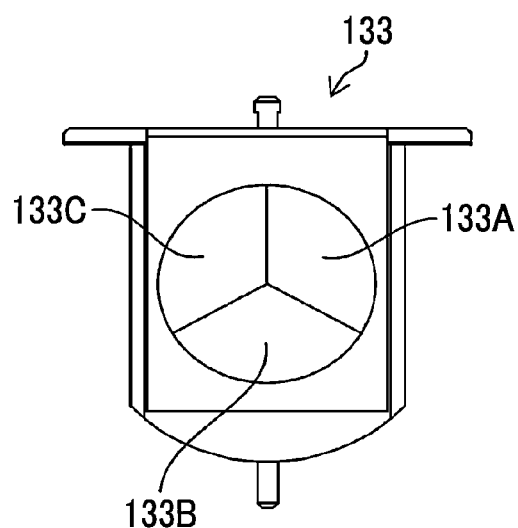

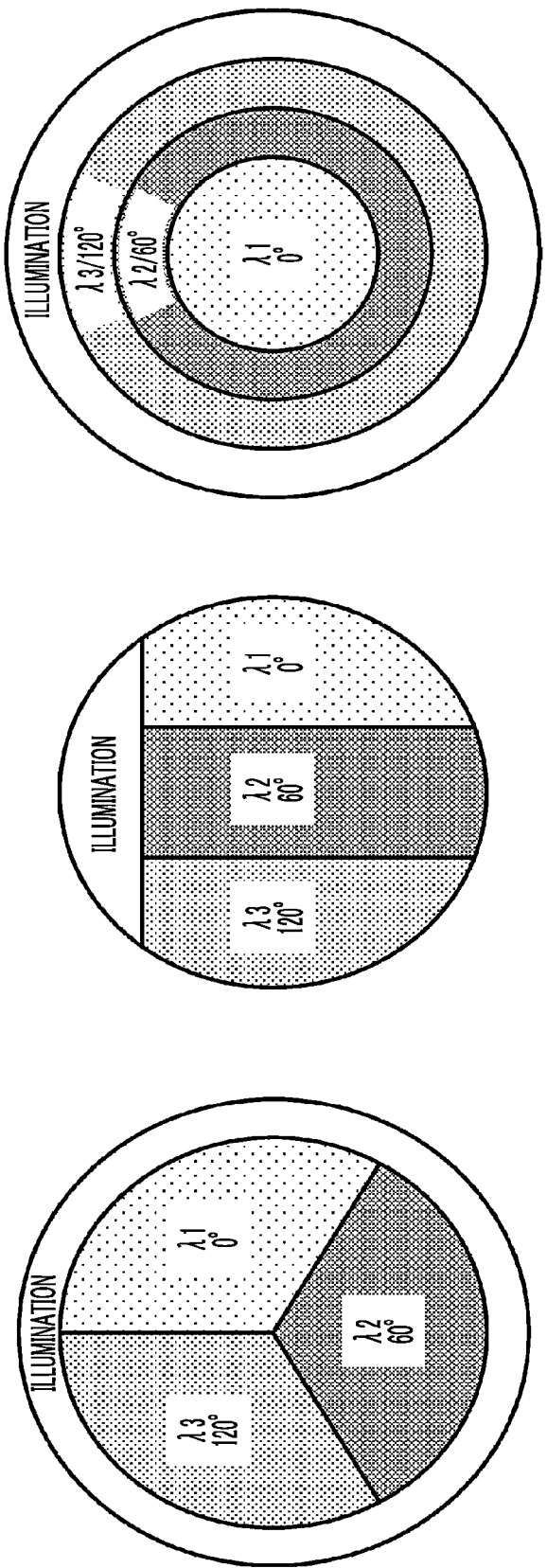

LENS DEVICE FOR FORMING IMAGE, AND IMAGING APPARATUS AND IMAGING METHOD WITH LENS DEVICE

CROSS-REFERENCE TO RELATED APPLICATIONS

The present application is a Continuation of PCT International Application No. PCT/JP2021/024055 filed on Jun. 25, 2021 claiming priority under 35 U.S.C § 119(a) to Japanese Patent Application No. 2020-112267 filed on Jun. 30, 2020. Each of the above applications is hereby expressly incorporated by reference, in its entirety, into the present application.

BACKGROUND OF THE INVENTION

1. Field of the Invention

The present invention relates to a lens device, an imaging apparatus, and an imaging method that are used to capture multispectral images.

2. Description of the Related Art

With regard to a technique for performing imaging using polarized light, JP2018-82424A discloses a technique for forming an image of a subject from first and second polarization images that are obtained in a case where the subject is irradiated with first polarized light and third and fourth polarization images that are obtained in a case where the subject is irradiated with second polarized light.

Further, JP1998-320538A (JP-H10-320538A) discloses a technique in which, in order to suppress regularly reflected light of light emitted from an illumination unit, a first polarizing filter is provided on an optical path between an imaging face and a light emitting part of an illumination unit and a second polarizing filter having a polarization plane different from a polarization plane of the first polarizing filter by 90° is provided on an optical path between the imaging face and an imaging element.

SUMMARY OF THE INVENTION

One embodiment of a technique of the present disclosure provides a lens device, an imaging apparatus, and an imaging method that suppress the occurrence of overexposure by dimming or blocking totally reflected light.

A lens device according to an embodiment of the present invention comprises: an optical system that includes a lens forming an optical image of a subject; a wavelength polarizing filter unit that is disposed at a pupil position of the optical system or near the pupil position and includes a plurality of aperture regions, a plurality of optical filters that are disposed in the plurality of aperture regions and include two or more optical filters transmitting lights having at least a part of wavelength ranges different from each other, and a plurality of first polarizing filters that are disposed in the plurality of aperture regions and are at least two first polarizing filters having polarization directions different from each other; and a first circularly polarizing optical element that is provided between the subject and the wavelength polarizing filter unit.

Preferably, the first circularly polarizing optical element converts illumination light of circularly polarized light, which is totally reflected by the subject, into linearly polarized light that has a polarization direction different from the polarization directions of the respective first polarizing filters.

Preferably, an optical axis of the first circularly polarizing optical element is disposed at a position different from the polarization direction of at least one of the first polarizing filters by 45°.

Preferably, the first circularly polarizing optical elements are provided in the optical system and are provided closer to a subject side than the wavelength polarizing filter unit.

Preferably, the first circularly polarizing optical elements are provided integrally with the wavelength polarizing filter unit.

Preferably, the wavelength polarizing filter unit includes the first circularly polarizing optical elements that are provided in the aperture regions and have optical axes different from each other, and the optical axis of each first circularly polarizing optical element is disposed at a position different from the polarization direction of the first polarizing filter provided in the corresponding aperture region by 45°.

Preferably, the first polarizing filters are provided in the aperture regions of the wavelength polarizing filter unit such that the polarization directions of the first polarizing filters have an interval of 60°.

Preferably, at least one of the aperture regions of the wavelength polarizing filter unit includes the aperture region that allows illumination light to pass therethrough.

Preferably, the lens device further comprises a second circularly polarizing optical element that converts illumination light of natural light into illumination light of circularly polarized light.

Preferably, the first circularly polarizing optical elements are provided integrally with the second circularly polarizing optical element.

An imaging apparatus according to another aspect of the present invention comprises: the above-mentioned lens device; a second polarizing filter that converts illumination light of natural light into linearly polarized light; a first illumination device that includes a second circularly polarizing optical element converting illumination light, which includes the linearly polarized light transmitted through the second polarizing filter, into circularly polarized light; and an imaging element that includes a plurality of polarizing elements having polarization directions different from each other and a plurality of pixel groups selectively receiving light transmitted through any one of the plurality of aperture regions.

An imaging apparatus according to another aspect of the present invention comprises: the above-mentioned lens device; a second polarizing filter that converts illumination light of natural light into linearly polarized light; a first illumination device that includes a second circularly polarizing optical element converting illumination light, which includes the linearly polarized light transmitted through the second polarizing filter, into circularly polarized light; and an imaging element that includes a plurality of polarizing elements having polarization directions different from each other and a plurality of pixel groups selectively receiving light transmitted through any one of the plurality of aperture regions, in which at least one of the aperture regions of the lens device transmits illumination light of the circularly polarized light from the first illumination device.

An imaging apparatus according to another aspect of the present invention comprises: the above-mentioned lens device; a second illumination device that includes a second polarizing filter converting illumination light of natural light into linearly polarized light; and an imaging element that includes a plurality of polarizing elements having polarization directions different from each other and a plurality of pixel groups selectively receiving light transmitted through any one of the plurality of aperture regions, in which at least one of the aperture regions of the lens device transmits illumination light of the linearly polarized light from the second illumination device.

An imaging method according to another aspect of the present invention is an imaging method that uses the above-mentioned imaging apparatus, and includes a step of transmitting illumination light, which is reflected by the subject, through the first circularly polarizing optical element.

BRIEF DESCRIPTION OF THE DRAWINGS

FIG. 16 is a flowchart showing an imaging method using the imaging apparatus.

FIG. 17 is a diagram illustrating a modification example of the frame.

FIGS. 26A, 26B, and 26C are diagrams showing modification examples of the wavelength polarizing filter unit of this embodiment.

DESCRIPTION OF THE PREFERRED EMBODIMENTS

A lens device, an imaging apparatus, and an imaging method according to preferred embodiments of the present invention will be described below with reference to the accompanying drawings.

Problems of a multispectral polarization camera (imaging apparatus) in the related art will be described first with reference to FIGS. 1 and 2.

Figure 1:
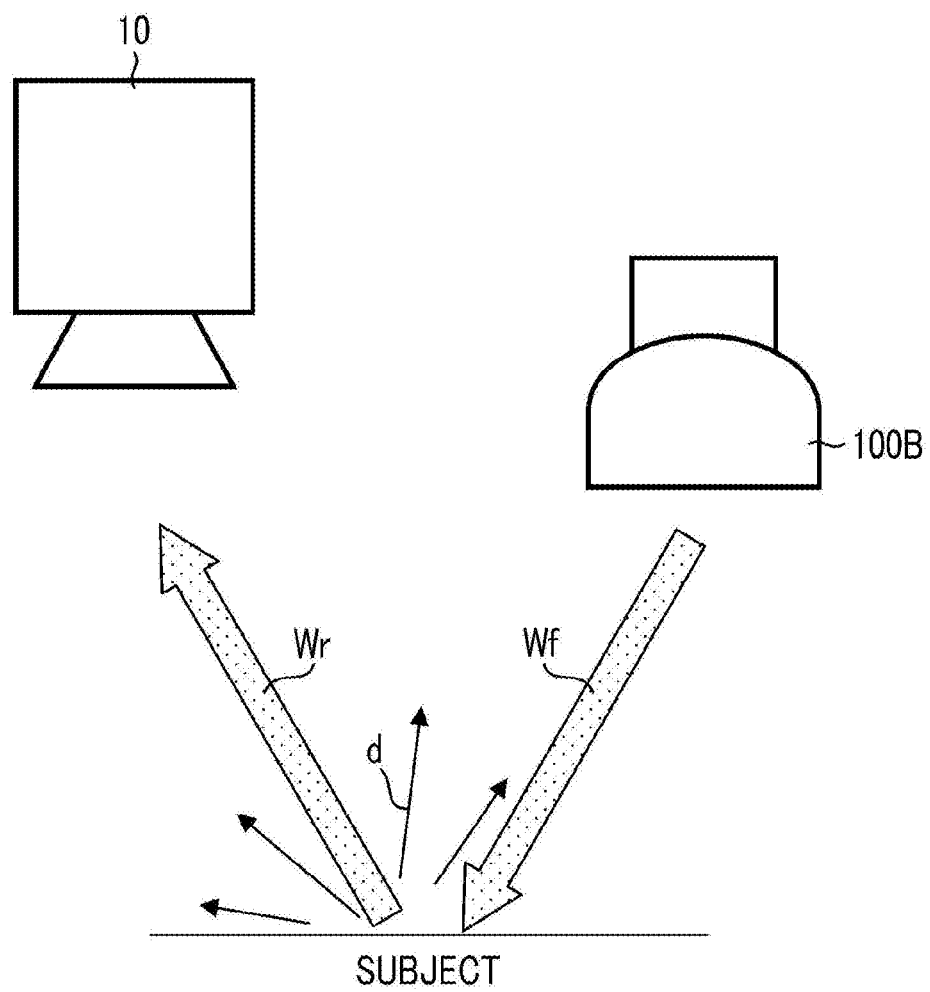
FIG. 1 illustrates a case where totally reflected light is imaged and overexposure occurs.

FIG. 1 is a diagram illustrating a case where totally reflected light is imaged and overexposure occurs.

An imaging apparatus 10 is a multispectral polarization camera as described later (see FIG. 3). In a case where the imaging apparatus 10 acquires a plurality of spectral images, the imaging apparatus 10 performs interference removal for a strong matrix operation on each polarization image obtained from imaging, and acquires a plurality of spectral images corresponding to each polarized light. Accordingly, in a case where there is an overexposed pixel, poor image quality, such as black defects, black-and-white reversal, or color mixture, of each image may occur around the pixel depending on the degree of exposure. Therefore, it is necessary to avoid imaging in an overexposure state in the case of imaging in, particularly, a multispectral polarization camera (imaging apparatus 10).

As shown in FIG. 1, illumination light Wf emitted from an illumination device 100B (FIG. 3) is reflected by a subject and is converted into totally reflected light Wr and diffused light d. The receiving of the totally reflected light Wr of the reflected light by an imaging element 210 (FIG. 3) of the imaging apparatus 10 is the major cause of overexposure. In addition, not only the totally reflected light of the above-mentioned subject but also totally reflected light reflected from the surface of a lens is the cause of overexposure in coaxial epi-illumination (or coaxial illumination) in which the illumination light Wf passes through the lens barrel.

Figure 2:
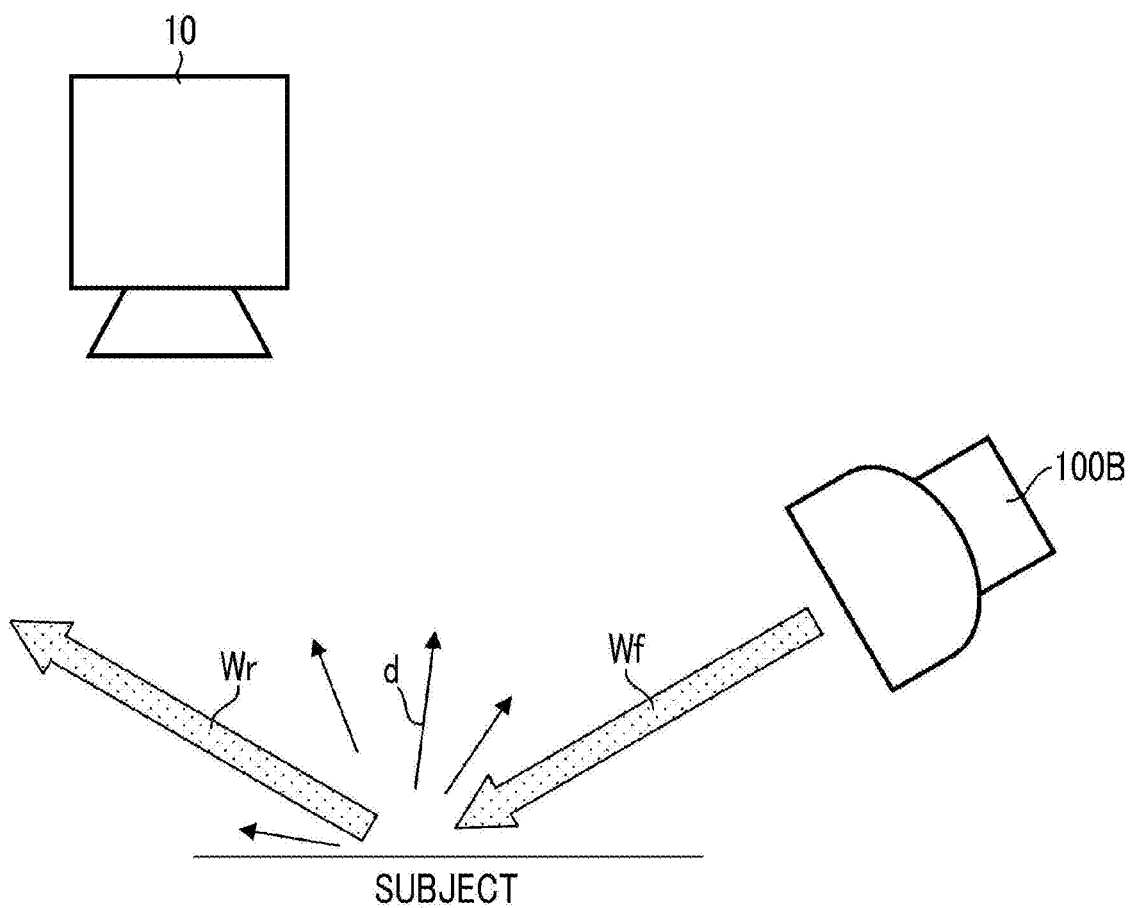
FIG. 2 is a diagram illustrating a method of adjusting the position of an illumination device.

A method shown in FIG. 2 is conceivable as a method of suppressing overexposure that is caused by the totally reflected light Wr generated in a case where the illumination light Wf is reflected by the subject. FIG. 2 is a diagram illustrating a method of adjusting the position of the illumination device 100B (the emission direction of the illumination light Wf).

As shown in FIG. 2, the position of the illumination device 100B is adjusted and/or the emission direction of the illumination light Wf is adjusted such that the totally reflected light Wr does not enter the imaging apparatus 10. Accordingly, it is possible to avoid the entry of the totally reflected light Wr in the imaging apparatus 10. However, in a case where the subject is obliquely (20 deg or more) illuminated as shown in FIG. 2, reflected light may be polarized. Further, in a case where imaging is performed in a state where the subject is obliquely illuminated and reflected light is polarized, the poor image quality of a spectral image is caused. Accordingly, it is not preferable that illumination light is obliquely applied to the subject in a case where imaging is performed by the imaging apparatus 10 (multispectral polarization camera).

Accordingly, a technique for suppressing overexposure by blocking or dimming the totally reflected light Wr before the totally reflected light Wr of the illumination light Wf reaches the imaging element 210 is proposed in the present invention.

First Embodiment

<Configuration of Imaging Apparatus>

Figure 3:
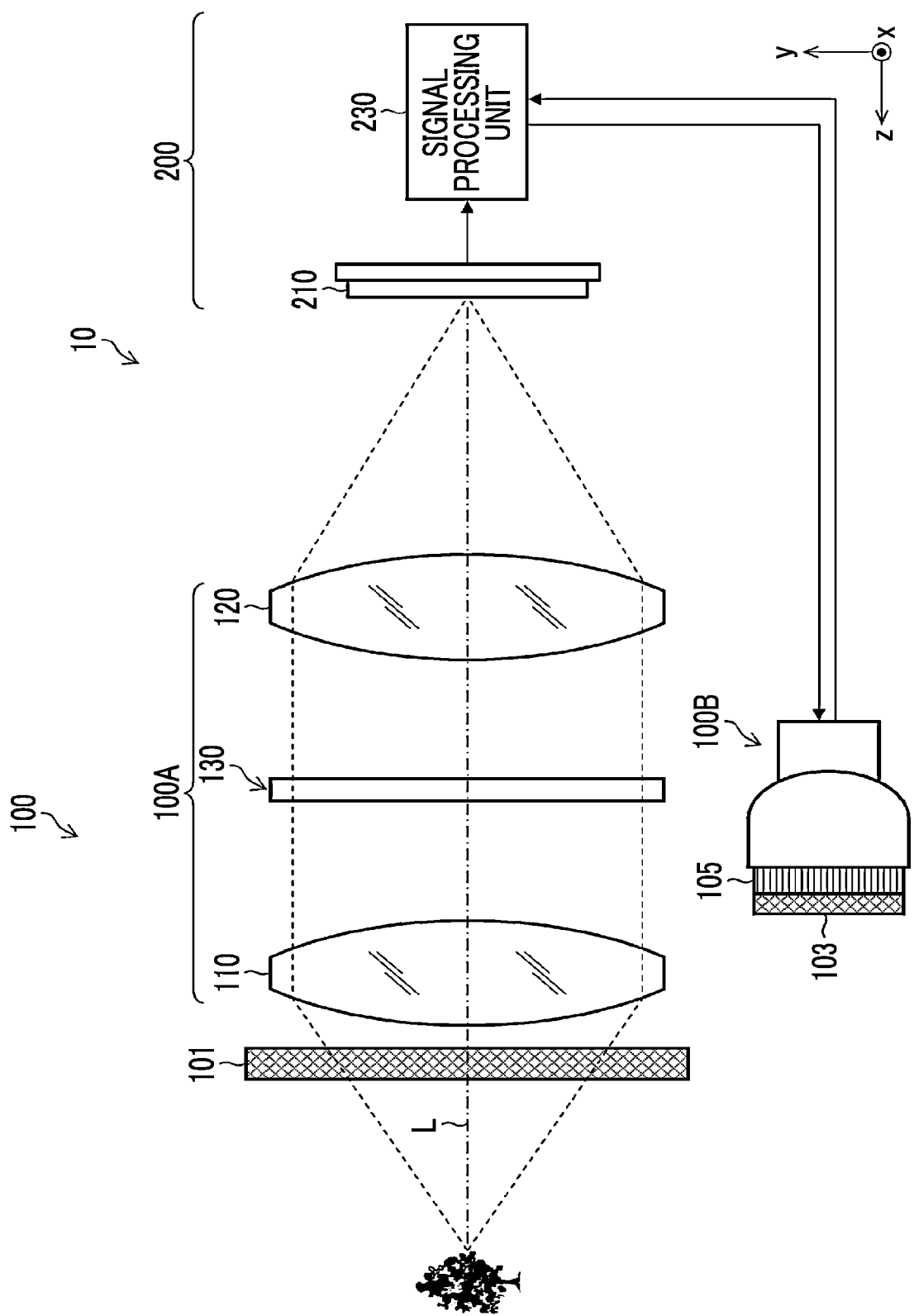
FIG. 3 is a diagram showing the schematic configuration of an imaging apparatus according to a first embodiment.

FIG. 3 is a diagram showing the schematic configuration of the imaging apparatus 10 according to a first embodiment. The imaging apparatus 10 according to the first embodiment is an imaging apparatus (multispectral camera) 10 that captures a multispectral image, and comprises a lens device 100, an imaging apparatus body 200, and the illumination device 100B. The imaging apparatus body 200 comprises the imaging element 210 and a signal processing unit 230. The lens device 100 comprises an optical system 100A that is composed of a first lens 110 and a second lens 120, a quarter wavelength plate (first circularly polarizing optical element) 101 that is disposed on a subject side of the first lens 110, and a wavelength polarizing filter unit 130 that is disposed at a pupil position of the optical system 100A or near the pupil position. Further, the illumination device 100B (first illumination device) comprises a polarizing filter (second polarizing filter) 105 that converts the illumination light Wf emitted from the illumination device 100B into linearly polarized light, and a quarter wavelength plate (second circularly polarizing optical element) 103 that converts the illumination light Wf converted into the linearly polarized light into circularly polarized light.

<Configuration of Image Generation Unit>

Figure 4:
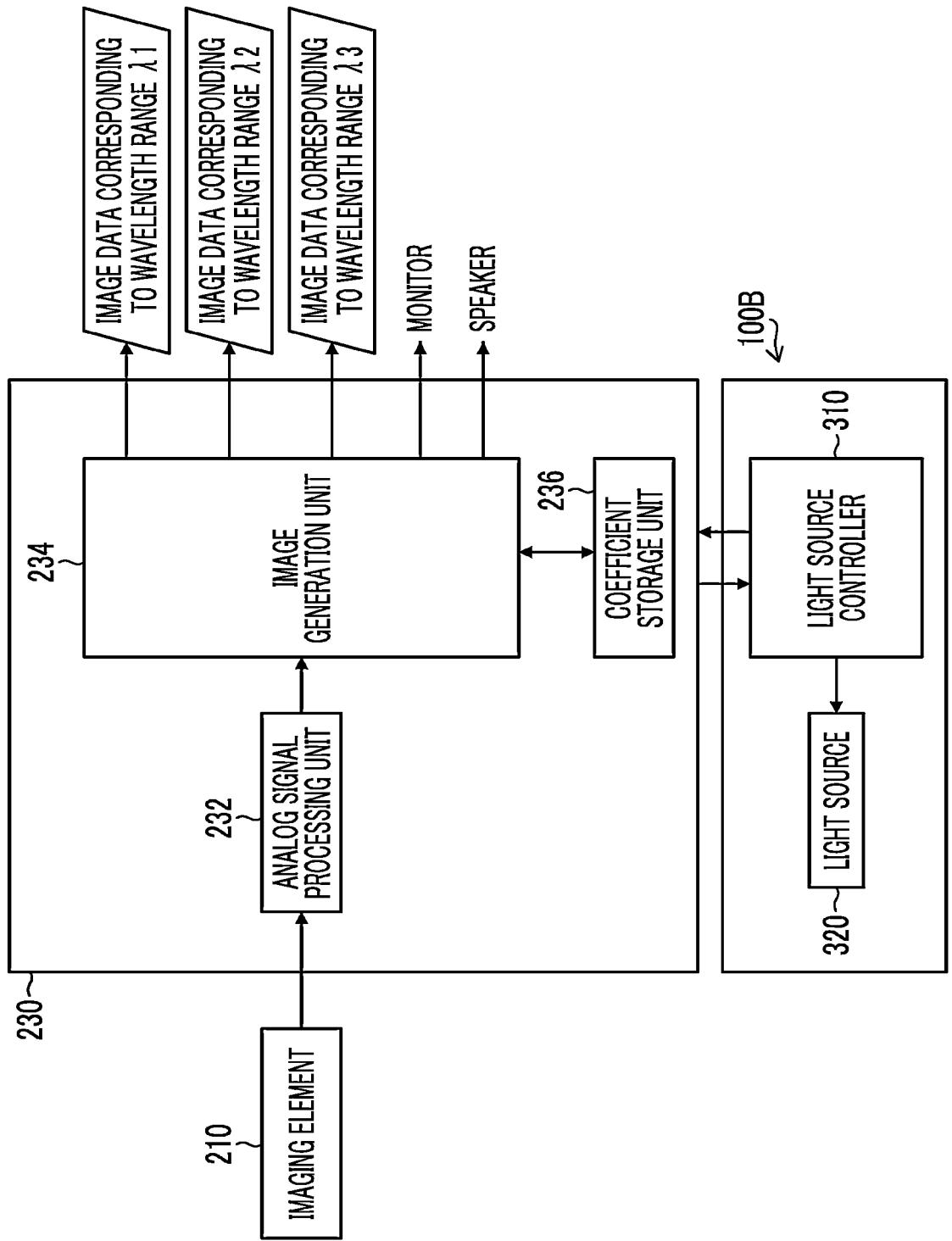
FIG. 4 is a diagram showing the configuration of a signal processing unit and the illumination device.

FIG. 4 is a diagram showing the configuration of the signal processing unit 230 and the illumination device 100B. The signal processing unit 230 comprises an analog signal processing unit 232 that performs analog signal processing on signals output from the imaging element, an image generation unit 234, and a coefficient storage unit 236. The image generation unit 234 (processor) comprises a non-transitory recording medium (not shown), such as a read only memory (ROM), in which computer readable codes of an imaging program causing a computer to perform an imaging method according to an embodiment of the present invention are recorded, and a transitory storage region (not shown) for work; and generates a plurality of images (spectral images), which correspond to the wavelength ranges of a plurality of optical filters arranged in the optical system 100A, respectively, on the basis of a plurality of image signals output from the imaging element 210 (image signals corresponding to different polarization directions). The image generation unit 234 can generate images (three-band multispectral images) corresponding to wavelength ranges λ1, λ2, and λ3.

The functions of the above-mentioned image generation unit 234 can be realized using various processors and recording mediums. The various processors also include, for example, a central processing unit (CPU) that is a general-purpose processor realizing various functions by executing software (program), a graphics processing unit (GPU) that is a processor specialized in image processing, and a programmable logic device (PLD) that is a processor of which circuit configuration can be changed after manufacture, such as a field programmable gate array (FPGA). Each function may be realized by one processor or may be realized by a plurality of processors of the same type or different types (for example, a plurality of FPGAs, a combination of a CPU and an FPGA, or a combination of a CPU and a GPU). Further, a plurality of functions may be realized by one processor. The hardware structures of these various processors are more specifically electrical circuitry where circuit elements, such as semiconductor elements, are combined.

In a case where the above-mentioned processors or electrical circuitry executes software (program), codes, which can be read by a computer (for example, various processors or electrical circuitry forming the image generation unit 234, and/or a combination thereof), of the software to be executed are stored in a non-transitory recording medium, such as ROM, and a computer refers to the software.

In a case where the imaging apparatus 10 receives an imaging instruction input from a shutter release switch (not shown) or the like, the imaging apparatus 10 performs the exposure control of the imaging element 210. The optical image of the subject, which is formed on the light-receiving surface of the imaging element 210 by this exposure control, is converted into electrical signals by the imaging element 210. Electric charge corresponding to the amount of light incident on a photodiode 212 is accumulated in each pixel of the imaging element 210, and electrical signals corresponding to the quantity of electric charge accumulated in each pixel are read out as image signals and output from the imaging element 210.

<Configuration of Illumination Device>

The illumination device 100B comprises a light source 320 that irradiates the subject with the illumination light Wf having spectral characteristics (wavelength ranges and the like) including the wavelength ranges (wavelength ranges λ1, λ2, and λ3) of the plurality of optical filters arranged in the above-mentioned optical system 100A, and a light source controller 310 that controls the irradiation of the subject with the illumination light Wf by the light source 320. The light emitted from the light source 320 is natural light, but is converted into linearly polarized light by the polarizing filter 105 and is converted into circularly polarized light by the quarter wavelength plate 103.

<Configuration of Imaging Element>

Figure 5:
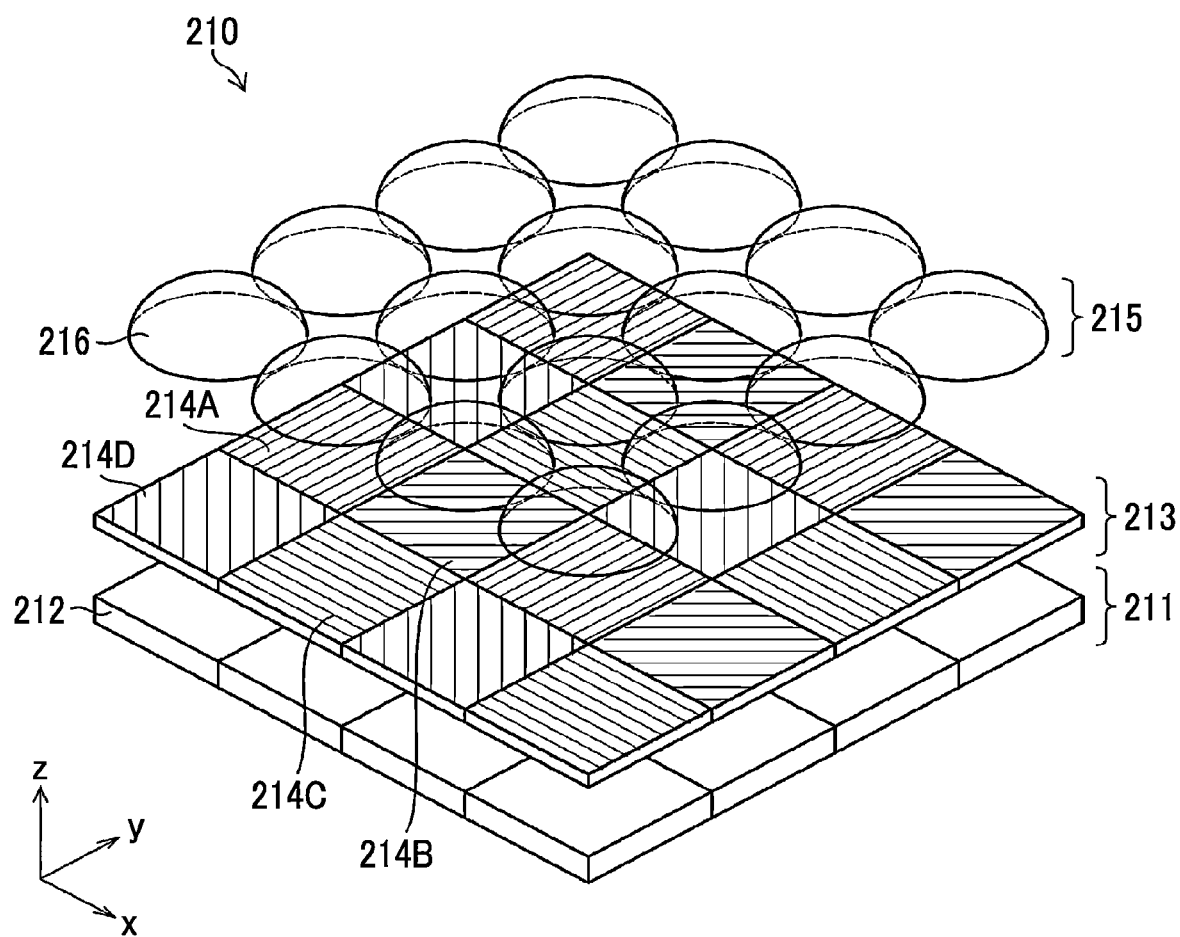
FIG. 5 is a diagram showing the schematic configuration of an imaging element.
Figure 6:
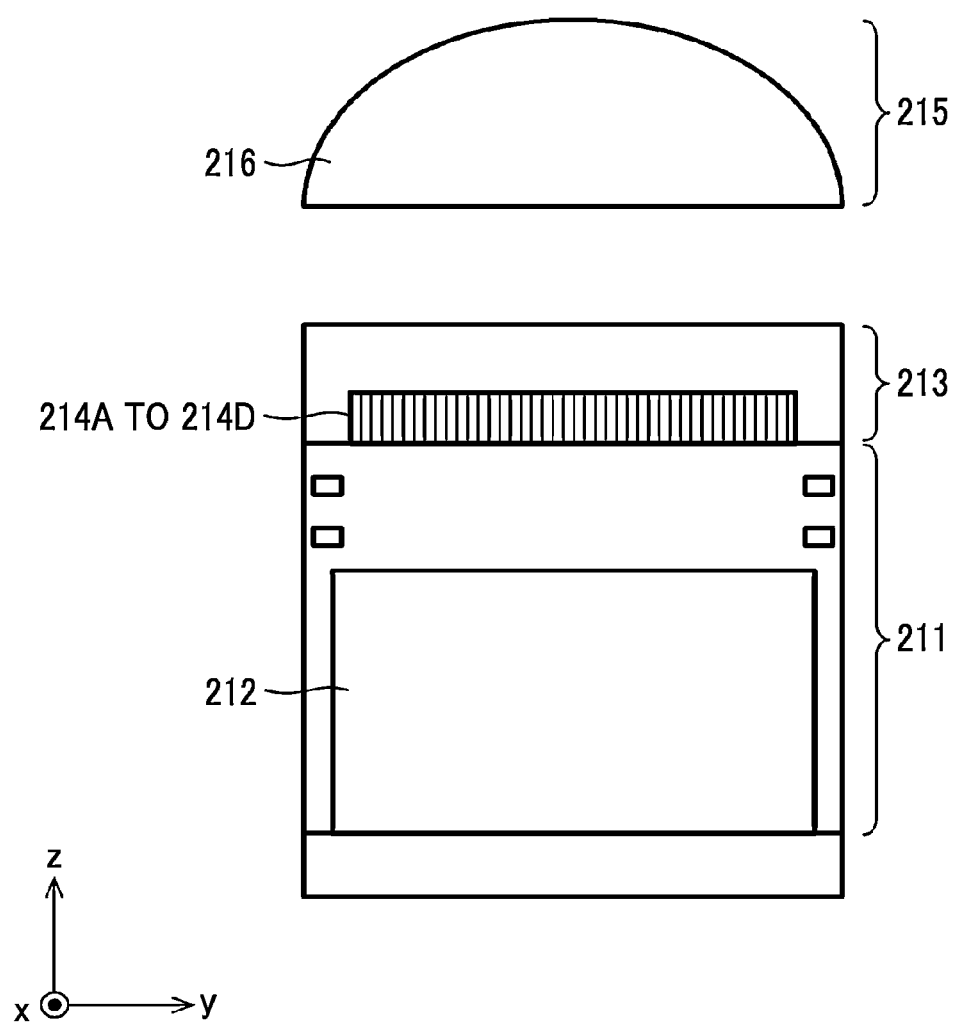
FIG. 6 is a cross-sectional view showing the schematic configuration of one pixel.

FIG. 5 is a diagram showing the schematic configuration of the imaging element 210, and FIG. 6 is a cross-sectional view showing the schematic configuration of one pixel shown in FIG. 5. The imaging element 210 is a complementary metal-oxide semiconductor (CMOS) type imaging element (image sensor), and is a monochrome imaging element that includes a pixel array layer 211, a polarizing filter element-array layer 213, and a microlens array layer 215. The respective layers are arranged in order of the pixel array layer 211, the polarizing filter element-array layer 213 (a plurality of polarizing elements), and the microlens array layer 215 from an image plane side toward an object side. The imaging element 210 is not limited to a CMOS type image sensor and may be an XY address type image sensor or a charge coupled device (CCD) type image sensor.

The pixel array layer 211 has a configuration in which a lot of photodiodes 212 (a plurality of pixel groups) are two-dimensionally arranged. One photodiode 212 forms one pixel. The respective photodiodes 212 are regularly arranged in a horizontal direction (x direction) and a vertical direction (y direction).

The polarizing filter element-array layer 213 has a configuration in which four types of polarizing filter elements 214A, 214B, 214C, and 214D (a plurality of polarizing elements) having different polarization directions (the polarization directions of light to be transmitted) are two-dimensionally arranged. The polarization directions of the polarizing filter elements 214A, 214B, 214C, and 214D can be set to, for example, 0°, 45°, 90°, and 135°. Further, these polarization directions can be made to correspond to the polarization directions of polarizing filters 144 (see FIG. 11)

of the wavelength polarizing filter unit 130. Due to these polarizing filter elements 214A to 214D, the imaging element 210 includes a plurality of image groups, each of which selectively receives any one of pieces of light transmitted through a plurality of aperture regions. These polarizing filter elements 214A and 214B are arranged at the same intervals as the photodiodes 212, and are provided for pixels, respectively.

The microlens array layer 215 comprises microlenses 216 that are arranged for the respective pixels.

<Configuration of Lens Device>

Figure 7:
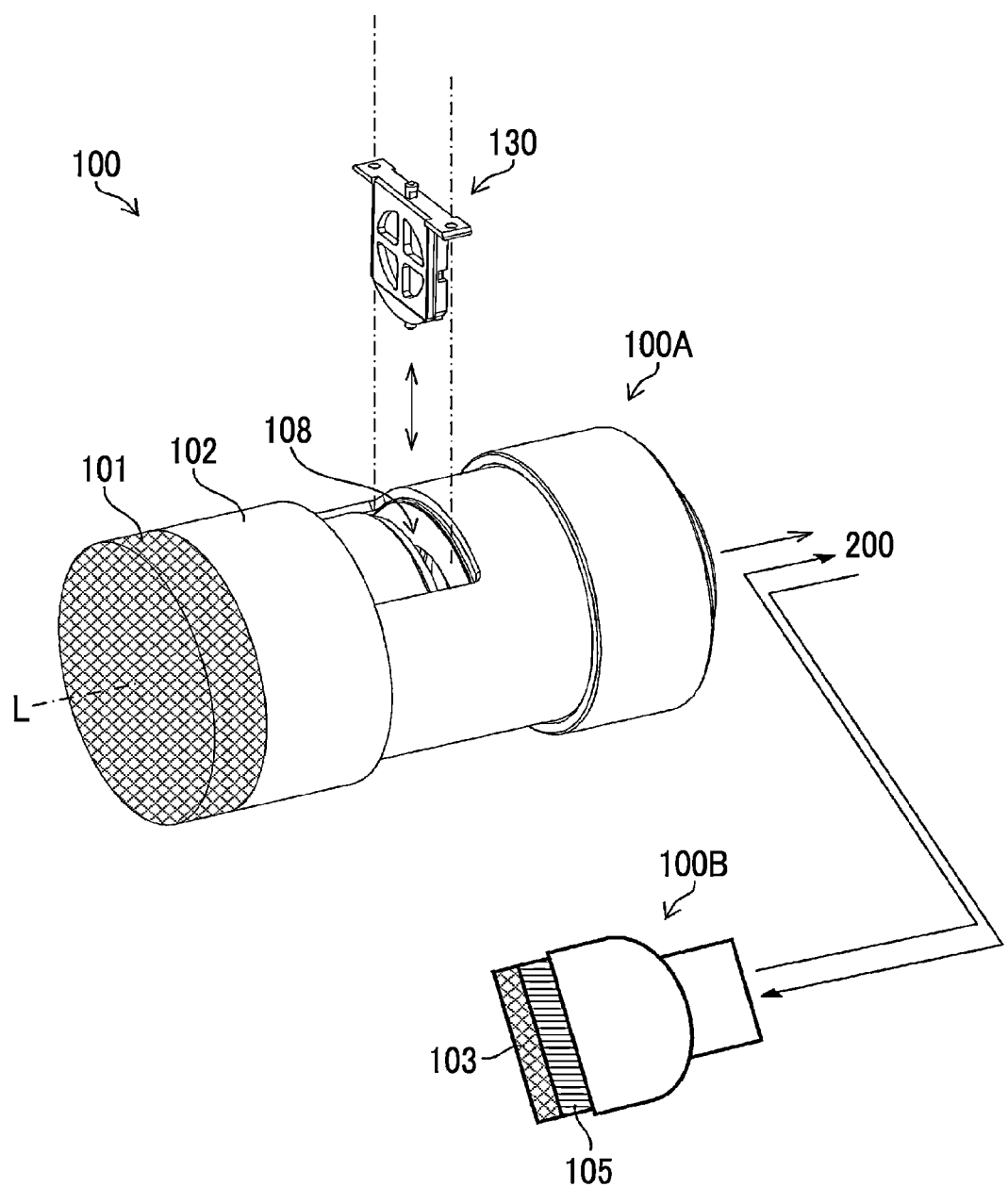
FIG. 7 is a perspective view showing the appearance of a lens device 100.
Figure 8:
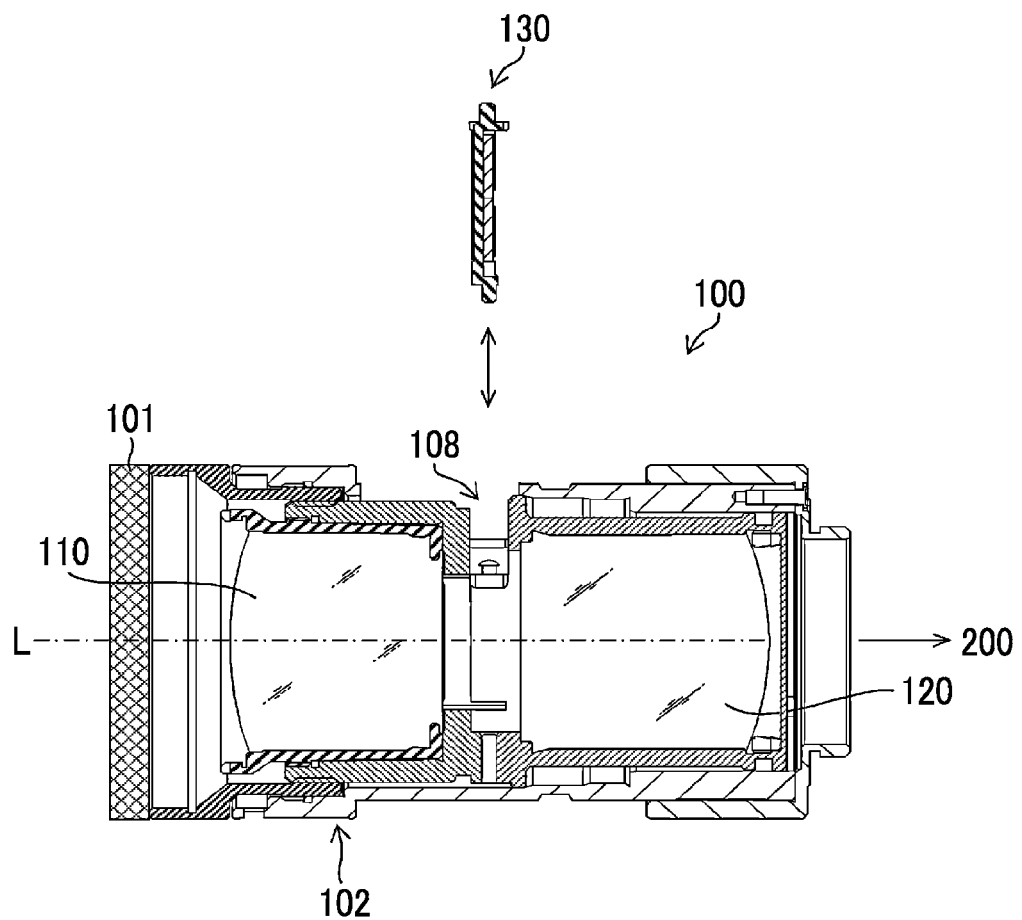
FIG. 8 is a cross-sectional view of the lens device taken in the direction of an optical axis L.

FIG. 7 is a perspective view showing the appearance of the lens device 100, and FIG. 8 is a cross-sectional view of the lens device 100 taken in the direction of an optical axis L. As shown in FIGS. 7 and 8, a single imaging optical system composed of the first lens 110 and the second lens 120 is disposed in a lens barrel 102 of the lens device 100. Each of the first lens 110 and the second lens 120 may be a lens group composed of a plurality of lenses. Further, a slit 108 is formed in the lens barrel 102 at a pupil position (near the pupil) of the lens device 100, and the wavelength polarizing filter unit 130 is inserted into the slit 108 and is disposed in a state where the optical axis of the wavelength polarizing filter unit 130 coincides with the optical axis L of the imaging optical system.

Figure 9B:
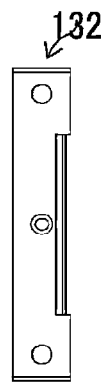
FIGS. 9A, 9B, 9C, 9D, 9E, and 9F are external views of a frame.
Figure 9E:
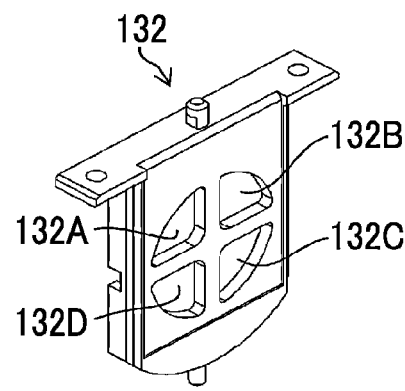
Figure 9A:
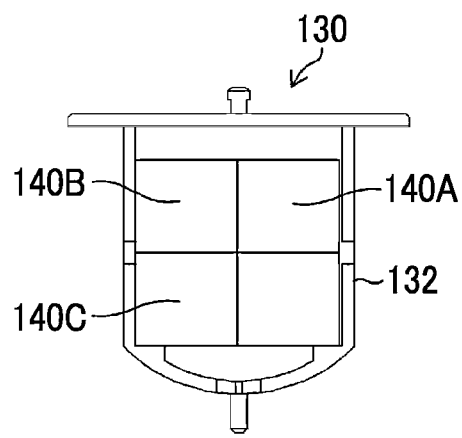
Figure 9C:
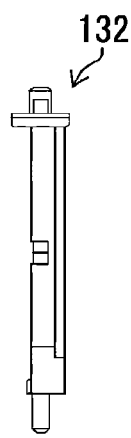
Figure 9F:
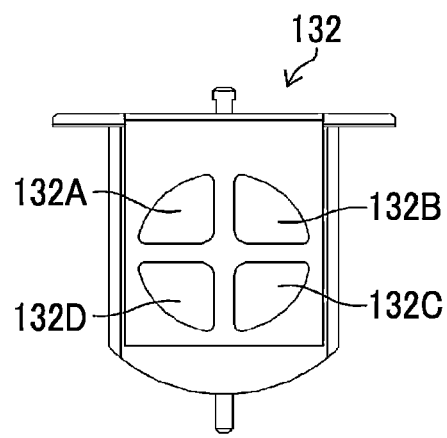
Figure 9D:
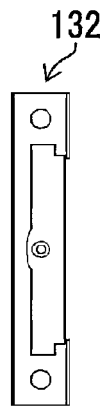
Figure 10:
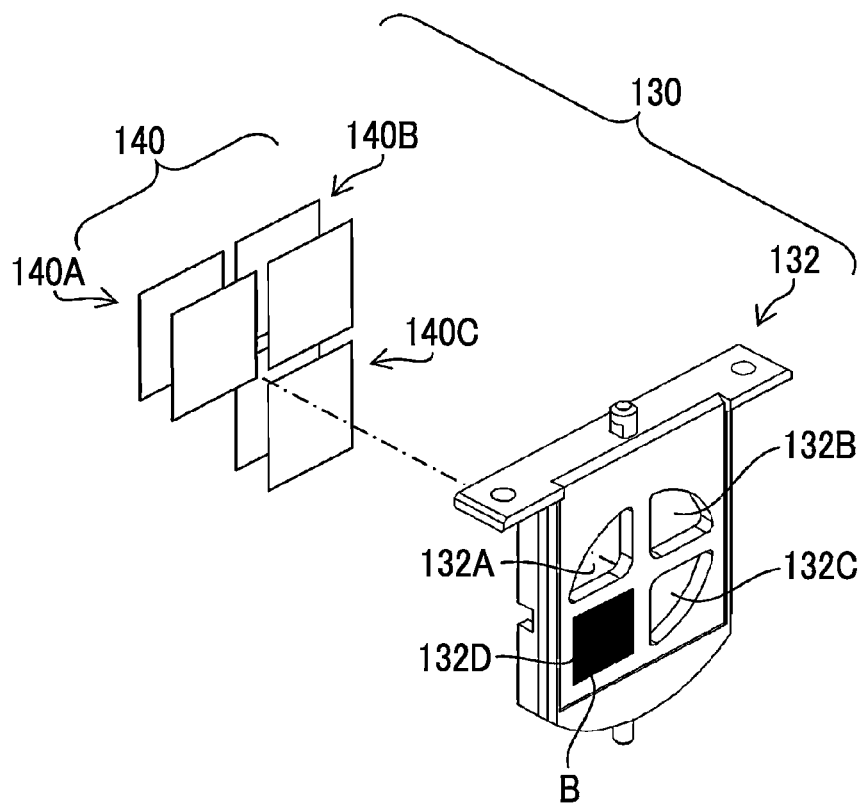
FIG. 10 is a diagram showing a configuration example of a wavelength polarizing filter unit.

FIGS. 9A, 9B, 9C, 9D, 9E, and 9F are external views of a frame 132, and FIG. 10 is a diagram showing a configuration example of the wavelength polarizing filter unit 130. Specifically, FIGS. 9A, 9B, 9C, 9D, 9E, and 9F are a back view, a top view, a left side view, a bottom view, a perspective view, and a front view, respectively. As shown in FIGS. 9E and 9F, the frame 132 comprises four aperture regions 132A to 132D. The shape of each of the aperture regions 132A to 132D is not limited to a fan shape, and may be other shapes, such as a circular shape, a rectangular strip shape, a rectangular shape, and a polygonal shape. Since it is sufficient to provide three aperture regions in this embodiment, the aperture region 132D is shielded from light by a shielding member B as shown in FIG. 10. In another embodiment (third embodiment) to be described later, the aperture region 132D is used without being shielded from light. Further, since the aperture region 132D is shielded from light by the shielding member B in this example, the aperture regions 132A to 132C are available but the present invention is not limited thereto. For example, the shielding member B may not be provided, and an optical filter having the same wavelength range as any one of the aperture regions 132A to 132C and a polarizing filter having the same polarization direction as the aperture region may be disposed in the aperture region 132D.

As shown in FIGS. 9A and 10, filter sets 140A to 140C (optical filters and polarizing filters) are disposed in the three aperture regions (132A to 132C) not shielded from light (on the back side of the frame 132), respectively. The filter sets 140A to 140C may be fixed using an adhesive.

Figure 11:
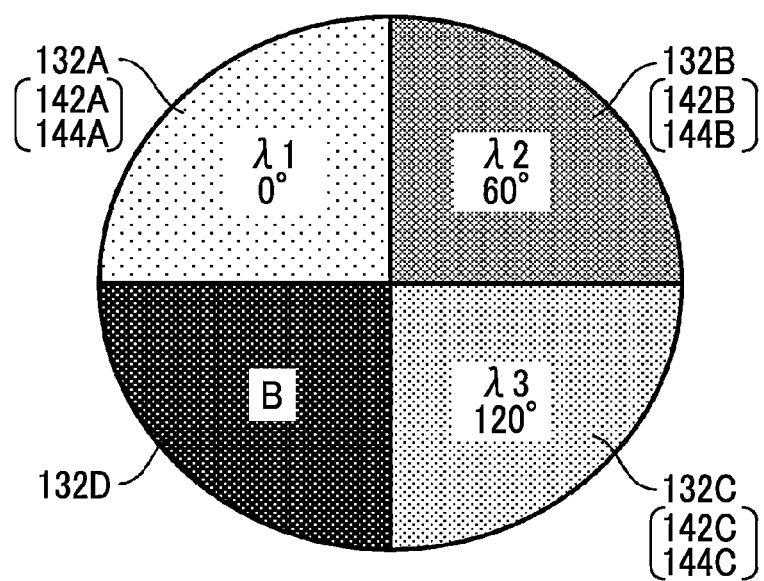
FIG. 11 is a conceptual diagram showing the wavelength polarizing filter unit.

FIG. 11 is a conceptual diagram showing the wavelength polarizing filter unit 130.

The wavelength polarizing filter unit 130 includes the aperture regions 132A to 132D. The filter set 140A is disposed in the aperture region 132A. The filter set 140A has a configuration in which an optical filter 142A transmitting light having the wavelength range λ1 from the subject side and a polarizing filter 144 (first polarizing filter) A having a polarization direction of 0° are disposed. The filter set 140B is disposed in the aperture region 132B. The filter set 140B has a configuration in which an optical filter 142B transmitting light having the wavelength range λ2 from the subject side and a polarizing filter 144 (first polarizing filter) B having a polarization direction of 60° are disposed. The filter set 140C is disposed in the aperture region 132C. The filter set 140C has a configuration in which an optical filter 142C transmitting light having the wavelength range λ3 from the subject side and a polarizing filter 144 (first polarizing filter) C having a polarization direction of 120° are disposed. The shielding member B is disposed in the aperture region 132D. Since three spectral images, that is, a spectral image corresponding to the wavelength range λ1, a spectral image corresponding to the wavelength range λ2, and a spectral image corresponding to the wavelength range λ3 are acquired in this example, the polarization directions of the polarizing filters 144A to 144C are different from each other. For example, in a case where two spectral images are to be acquired, at least two polarizing filters having polarization directions different from each other are used. Further, a part of wavelength ranges of λ1, λ2, and λ3 are different from each other.

Figure 12:
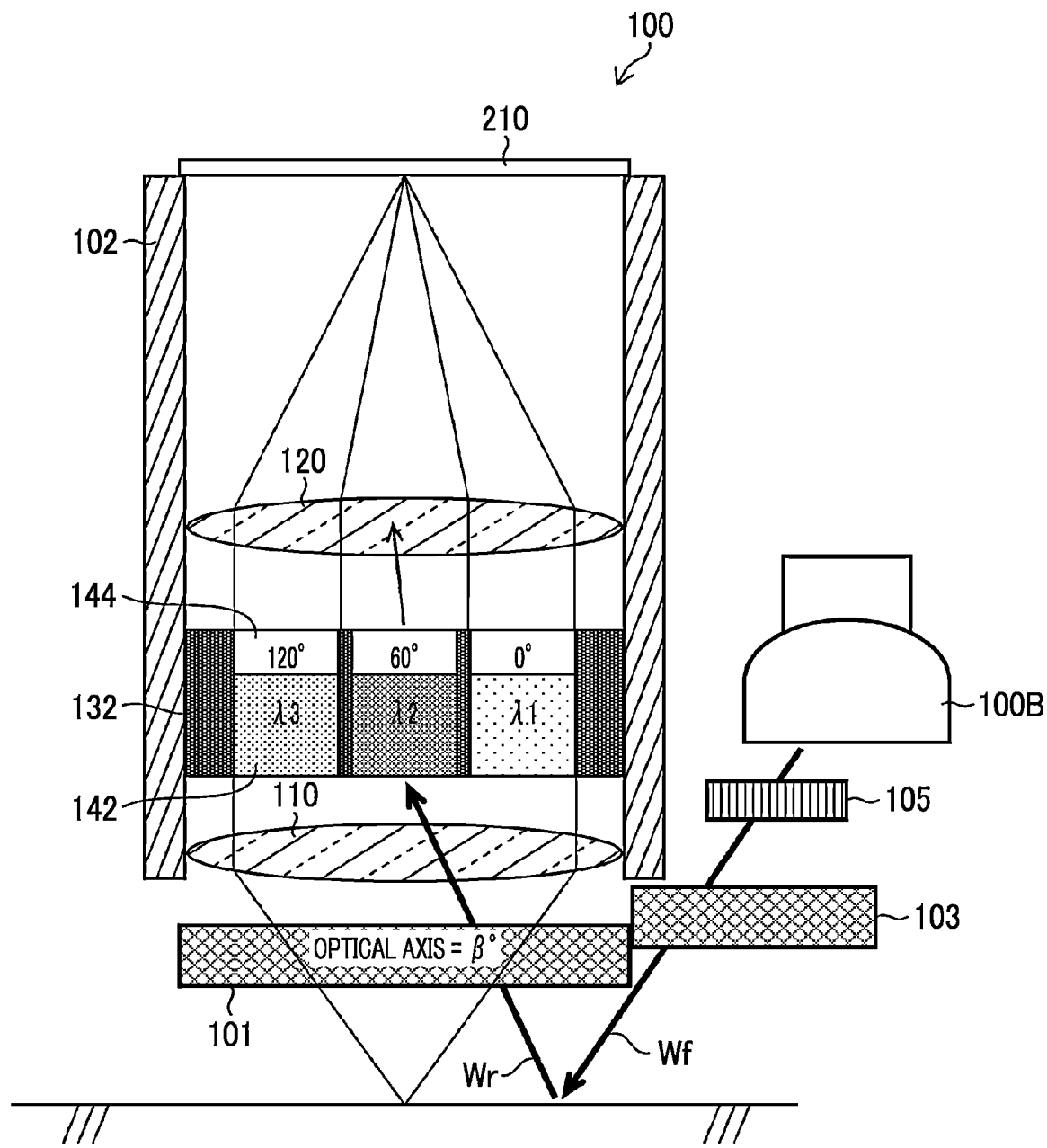
FIG. 12 is a diagram illustrating Specific example 1 of this embodiment.

FIG. 12 is a diagram illustrating Specific example 1 of this embodiment.

The quarter wavelength plate (first circularly polarizing optical element) 101 is provided on the subject side of the first lens 110. Further, the polarizing filter (second polarizing filter) 105 and the quarter wavelength plate (second circularly polarizing optical element) 103 are provided in order from the light source 320 in the emission direction of the illumination device 100B. Here, the polarizing filter 105 is disposed to have a polarization direction (polarization axis) of α° (α is an arbitrary numerical value determined by a user). Further, the quarter wavelength plate 103 is disposed to have an optical axis corresponding to (α+45°). Accordingly, the illumination light Wf transmitted through the quarter wavelength plate 103 is converted into clockwise circularly polarized light.

The quarter wavelength plate 101 is disposed to have an optical axis corresponding to β° (β is an arbitrary numerical value determined by a user. Here, β is not −45°, +15°, and +115°). Accordingly, the totally reflected light Wr transmitted through the quarter wavelength plate 101 is converted into linearly polarized light having a polarization direction of (β+45°).

The illumination device 100B emits illumination light Wf of natural light, and converts the illumination light Wf into illumination light Wf of linearly polarized light (a polarization direction of α°) by the polarizing filter 105. Further, the illumination light Wf converted into linearly polarized light is transmitted through the quarter wavelength plate 103, and is converted into clockwise circularly polarized light. The illumination light Wf converted into clockwise circularly polarized light is reflected by a subject. The totally reflected light Wr of the reflected illumination light Wf is converted into counterclockwise circularly polarized light. In a case where the totally reflected light Wr is transmitted through the quarter wavelength plate 101, the totally reflected light Wr is converted into linearly polarized light having a polarization direction of (β+45°). (β+45°) is different from the polarization directions (120°, 60°, and 0°) of all of the polarizing filters 144. Accordingly, the totally reflected light Wr is dimmed due to a difference between the polarization direction of the totally reflected light Wr and the polarization direction of the polarizing filter 144 and reaches the imaging element 210. Further, in a case where the polarization direction of (β+45°) of the totally reflected light Wr and the polarization direction of the polarizing filter 144 are orthogonal to each other, the totally reflected light Wr is blocked and does not reach the imaging element 210.

As described above, in this example, the totally reflected light Wr is transmitted through the quarter wavelength plate 101, so that the totally reflected light Wr is converted into totally reflected light Wr including linearly polarized light having a polarization direction of (β+45°) different from the polarization directions (0°, 60°, and 120°) of the polarizing filters 144 of the wavelength polarizing filter unit 130. Then, since the converted totally reflected light Wr is dimmed or blocked in a case where the converted totally reflected light Wr is transmitted through the polarizing filter 144, overexposure caused by the totally reflected light Wr can be suppressed. Further, since the illumination light Wf is converted into circularly polarized light first and the totally reflected light Wr is then converted into linearly polarized light in this example, a user can set the direction of the linearly polarized light of the totally reflected light Wr with a high degree of freedom according to the polarization direction of the polarizing filter 144.

Figure 13:
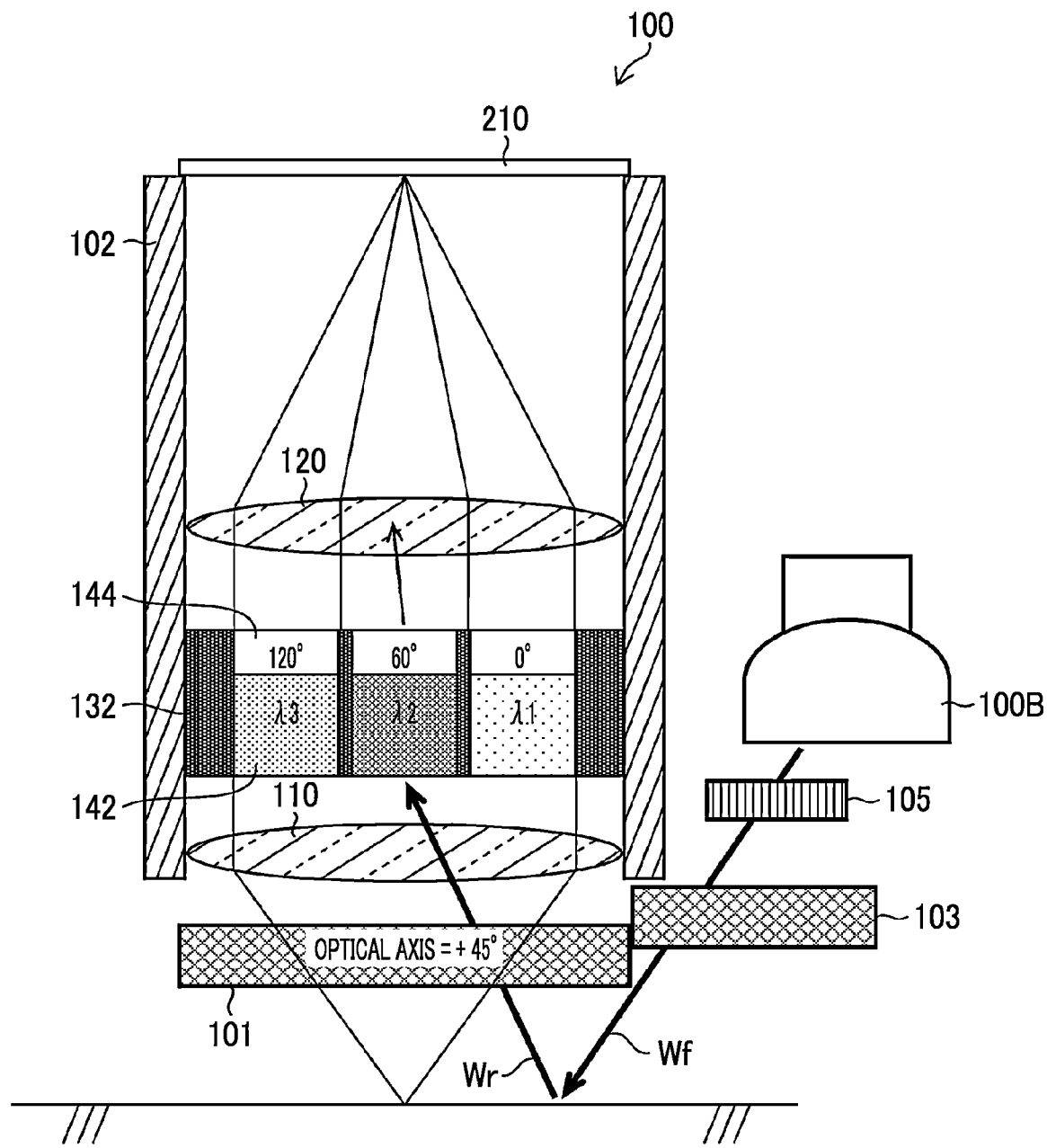
FIG. 13 is a diagram illustrating Specific example 2 of this embodiment.

FIG. 13 is a diagram illustrating Specific example 2 of this embodiment. In this example, the optical axis of the quarter wavelength plate 101 is disposed at a position different from the polarization direction of the polarizing filter 144A by 45°.

In the example shown in FIG. 13, a polarizing filter 105 is disposed to have a polarization direction (polarization axis) of 0°. Further, a quarter wavelength plate 103 is disposed to have an optical axis corresponding to +45°. Furthermore, a quarter wavelength plate 101 is disposed to have an optical axis corresponding to +45°.

Illumination light Wf of natural light, which is emitted from the illumination device 100B, is transmitted through the polarizing filter 105 and is converted into linearly polarized light having a polarization direction of 0°. After that, the illumination light Wf is converted into clockwise circularly polarized light by being transmitted through the quarter wavelength plate 103, and is reflected by a subject. Totally reflected light Wr is converted into counterclockwise circularly polarized light, is transmitted through the quarter wavelength plate 101, and is converted into linearly polarized light having a polarization direction of 90°.

Accordingly, since the polarization direction of the polarizing filter 144A provided in the aperture region 132A corresponds to 0°, the totally reflected light Wr having a polarization direction of 90° is blocked. Further, the totally reflected light Wr is dimmed in the aperture region 132B due to a difference between the polarization direction of the totally reflected light Wr and the polarization direction of the polarizing filter 144B (a polarization direction of 60°), and the totally reflected light Wr is dimmed in the aperture region 132C due to a difference between the polarization direction of the totally reflected light Wr and the polarization direction of the polarizing filter 144C (a polarization direction of 120°).

As described above, in this example, the totally reflected light Wr is transmitted through the quarter wavelength plate 101, so that the totally reflected light Wr is converted into linearly polarized light having a polarization direction of (90)° different from the polarization direction (0°) of the polarizing filter 144A of the aperture region 132A by 90°. Further, the totally reflected light Wr is transmitted through the quarter wavelength plate 101, so that the totally reflected light Wr is converted into linearly polarized light having a polarization direction different from the polarization directions of the polarizing filter 144B of the aperture region 132B and the polarizing filter 144C of the aperture region 132C. Accordingly, since the totally reflected light Wr is blocked in the aperture region 132A and is dimmed in the aperture regions 132B and 132C in this example, overexposure caused by the totally reflected light Wr can be suppressed.

Figure 14:
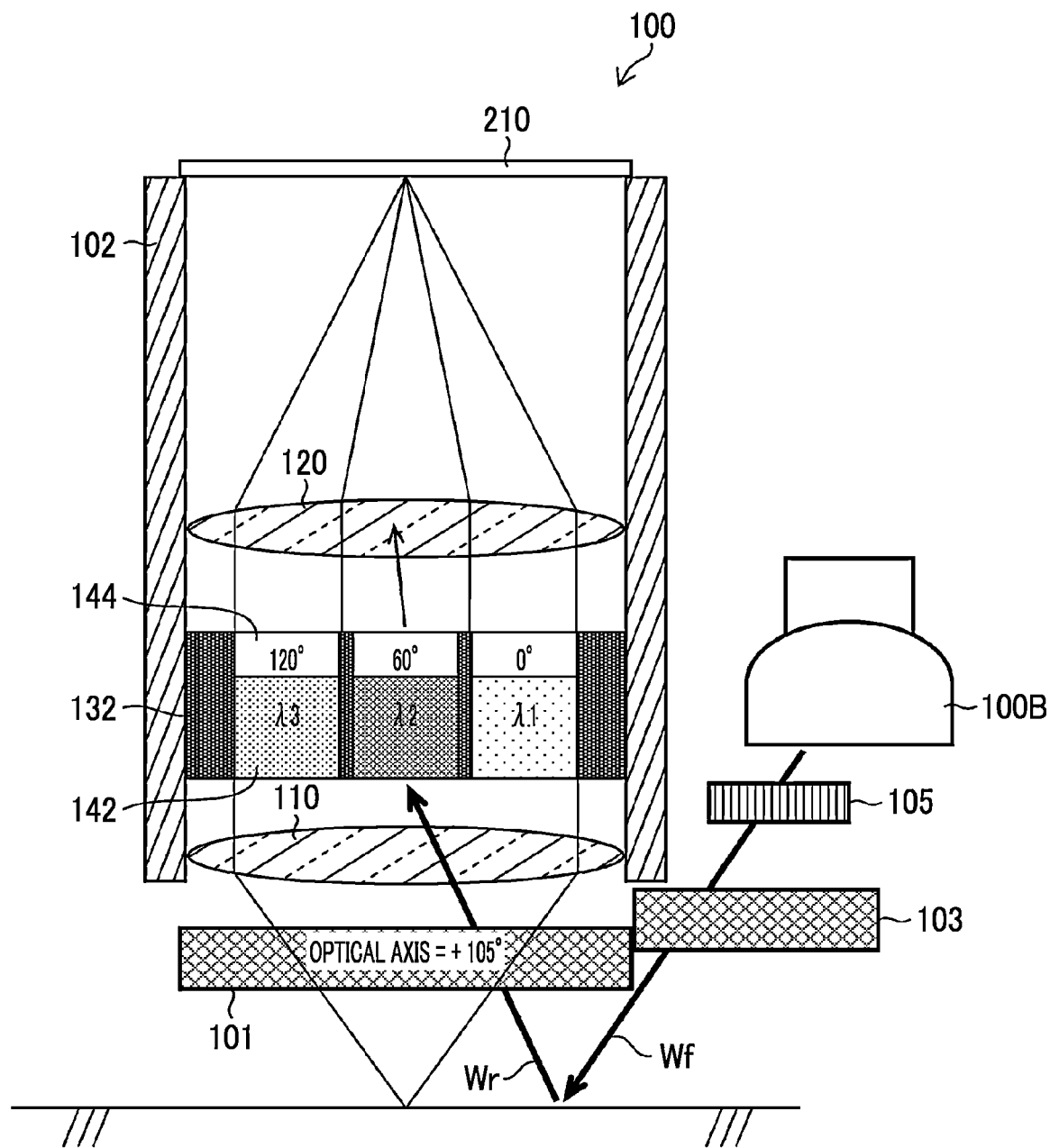
FIG. 14 is a diagram illustrating Specific example 3 of this embodiment.

FIG. 14 is a diagram illustrating Specific example 3 of this embodiment. In this example, the optical axis of a quarter wavelength plate 101 is disposed at a position different from the polarization direction of the polarizing filter 144B by 45°.

In the example shown in FIG. 14, a polarizing filter 105 is disposed to have a polarization direction (polarization axis) of 0°. Further, a quarter wavelength plate 103 is disposed to have an optical axis corresponding to +45°. Furthermore, the quarter wavelength plate 101 is disposed to have an optical axis corresponding to +105°.

Illumination light Wf of natural light, which is emitted from the illumination device 100B, is transmitted through the polarizing filter 105 and is converted into linearly polarized light having a polarization direction of 0°. After that, the illumination light Wf is converted into clockwise circularly polarized light by being transmitted through the quarter wavelength plate 103, and is reflected by a subject. Totally reflected light Wr is converted into counterclockwise circularly polarized light, is transmitted through the quarter wavelength plate 101, and is converted into linearly polarized light having a polarization direction of 150°. Accordingly, since the polarization direction of the polarizing filter 144B provided in the aperture region 132B corresponds to 60°, the totally reflected light Wr having a polarization direction of 150° is blocked. Further, the totally reflected light Wr is dimmed in the aperture region 132A due to a difference between the polarization direction of the totally reflected light Wr and the polarization direction of the polarizing filter 144A (a polarization direction of 0°), and the totally reflected light Wr is dimmed in the aperture region 132C due to a difference between the polarization direction of the totally reflected light Wr and the polarization direction of the polarizing filter 144C (a polarization direction of 120°).

As described above, in this example, the totally reflected light Wr is transmitted through the quarter wavelength plate 101, so that the totally reflected light Wr is converted into linearly polarized light having a polarization direction of 150° different from the polarization direction (60°) of the polarizing filter 144B of the aperture region 132B by 90°. Further, the totally reflected light Wr is transmitted through the quarter wavelength plate 101, so that the totally reflected light Wr is converted into linearly polarized light having a polarization direction different from the polarization directions of the polarizing filter 144A of the aperture region 132A and the polarizing filter 144C of the aperture region 132C. Accordingly, since the totally reflected light Wr is blocked in the aperture region 132B and is dimmed in the aperture regions 132B and 132C in this example, overexposure caused by the totally reflected light Wr can be suppressed.

<Image Generation Processing>

Next, image generation processing using the lens device 100 and the imaging apparatus body 200 having the above-mentioned configuration will be described. Here, in the wavelength polarizing filter unit 130, the wavelength ranges of the optical filters are three types (λ1 to λ3), the polarization directions are also three types (for example, 0°, 45°, and 90°), and the polarization directions of the imaging element 210 are four types (0°, 45°, 90°, and 135°). In this case, for example, the frame 132 (aperture region 132D) shown in FIG. 10 is shielded from light by the shielding member B and is used.

<Coefficient Group for Interference Removal>

In order to obtain images corresponding to the wavelength ranges ($\lambda 1$ to $\lambda 3$), it is necessary to separate and extract pixel signals, which correspond to the respective wavelength ranges, from the respective pixels of the imaging element 210. However, interference (cross talk) occurs in these image data. That is, since lights having the respective wavelength ranges are incident on the respective pixels, an image to be generated is an image in which images corresponding to the wavelength ranges $\lambda 1$ to $\lambda 3$ are mixed. For this reason, the image generation unit 234 performs interference removal processing to generate image data corresponding to the respective wavelength ranges ($\lambda 1$ to $\lambda 3$).

Ratios (interference ratios) at which lights having the respective wavelength ranges $\lambda 1$ to $\lambda 3$ and emitted from the lens device 100 are received by the respective pixels can be uniquely determined from the setting of the wavelength ranges $\lambda 1$ to $\lambda 3$ of lights transmitted by the optical filters 142A to 142C, the setting of the polarization directions of lights transmitted by the polarizing filters 144A to 144C, and the setting of the polarization directions (four directions) of lights received by the respective pixels of the imaging element 210; and can be obtained in advance. The image generation unit 234 can calculate the interference ratios from a plurality of images, which are acquired in a state where any one of a plurality of shielding members is mounted on the lens device 100, using the plurality of shielding members that shield aperture regions other than a specific aperture region among a plurality of aperture regions.

Figure 15A:
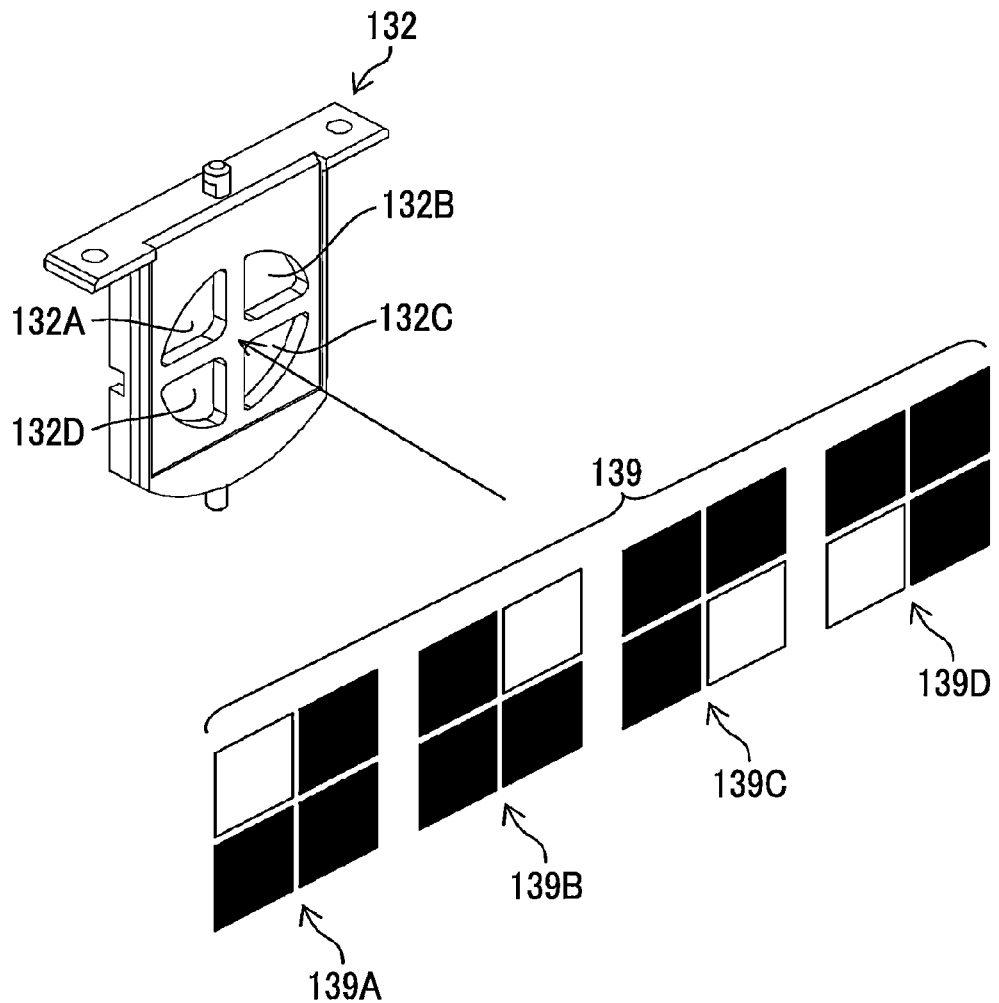
FIGS. 15A and 15B are diagrams showing aspects in which a shielding member is mounted on the frame.
Figure 15B:
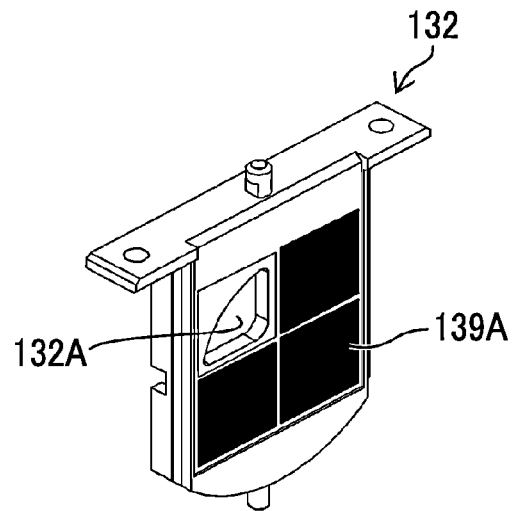

FIGS. 15A and 15B are diagrams showing aspects in which a shielding member is mounted on the frame 132. As shown in FIG. 15A, a shielding member 139 comprises a plurality of shielding members each of which opens any one of the aperture regions 132A to 132D of the frame 132 and shields the other aperture regions. Specifically, each of the shielding members 139A to 139D shields aperture regions other than each of the aperture regions 132A, 132B, 132C, and 132D (a specific aperture region). FIG. 15B shows the frame 132 on which the shielding member 139A is mounted. In a case where the aperture regions and the polarization directions are three or less types as described above (for example, a case where one or more aperture regions are shielded among four apertures or a case where an optical member including three or less aperture regions is used), the shielding members may also be three or less types. A case where the aperture regions and the polarization directions are three or less types will be described.

In this case, imaging is performed using the shielding members 139A to 139C one by one, so that three images corresponding to three wavelength ranges are obtained. The image generation unit 234 calculates coefficient groups (the respective elements of an interference removal matrix) for interference removal processing from these images, and the coefficient storage unit 236 stores these coefficient groups.

The image generation unit 234 acquires coefficient groups from the coefficient storage unit 236, calculates pixel signals corresponding to the respective wavelength ranges $\lambda 1$ to $\lambda 3$ from pixel signals obtained from the respective pixels by the following equation 1, and generates image data corresponding to the respective wavelength ranges $\lambda 1$ to $\lambda 3$. In Equation 1, for example, a pixel signal corresponding to the wavelength range $\lambda 1$ (the polarizing filter element 214A having a polarization direction of 0°) is denoted by x1, a pixel signal corresponding to the wavelength range $\lambda 2$ (the polarizing filter element 214B having a polarization direction of 45°) is denoted by x2, and a pixel signal corresponding to the wavelength range $\lambda 3$ (the polarizing filter element 214C having a polarization direction of 90°) is denoted by x3. Further, a matrix A is acquired from the coefficient storage unit 236. The image generation unit 234 acquires pixel signals X1, X2, and X3 (image data) corresponding to spectral images, which are subjected to interference removal and correspond to the wavelength ranges $\lambda 1$ to $\lambda 3$, from three pixel signals x1, x2, and x3 by the following equation 1 that uses the matrix A. The image data, which correspond to the respective wavelength ranges $\lambda 1$ to $\lambda 3$ and are generated by the image generation unit 234, are output to the outside and are stored in a storage device (not shown) as necessary. Further, the image data are displayed on a display (not shown) as necessary.

$$A = \begin{bmatrix} a11 & a12 & a13 \\ a21 & a22 & a23 \\ a31 & a32 & a33 \end{bmatrix} \quad (1)$$

$$\begin{bmatrix} X1 \\ X2 \\ X3 \end{bmatrix} = \begin{bmatrix} a11 & a12 & a13 \\ a21 & a22 & a23 \\ a31 & a32 & a33 \end{bmatrix} * \begin{bmatrix} x1 \\ x2 \\ x3 \end{bmatrix}$$

<Imaging Method>

Next, an imaging method using the imaging apparatus 10 will be described.

FIG. 16 is a flowchart showing the imaging method using the imaging apparatus 10.

First, the illumination device 100B is turned on and a subject is illuminated with illumination light Wf (Step S1). The illumination light Wf is natural light when the illumination light Wf is emitted from the illumination device 100B. However, the illumination light Wf is converted into illumination light Wf of linearly polarized light by the polarizing filter 105, and is converted into illumination light Wf including circularly polarized light by the quarter wavelength plate 103.

After that, totally reflected light Wr of light reflected by the subject is transmitted through the quarter wavelength plate 101 and converted into linearly polarized light (Step S2). Totally reflected light Wr, which is the linearly polarized light, is dimmed or blocked depending on a difference between the polarization direction of the totally reflected light Wr and the polarization direction of the polarizing filter 144.

Then, the dimmed totally reflected light Wr and light diffused and reflected by the surface of the subject reach the imaging element 210 and are imaged (Step S3), so that a plurality of spectral images can be obtained.

Each configuration and function having been described above can be appropriately realized by arbitrary hardware, arbitrary software, or a combination of both arbitrary hardware and arbitrary software. For example, the present invention can also be applied to a program that causes a computer to perform the above-mentioned processing steps (processing procedure), a computer-readable recording medium (non-transitory recording medium) in which such a program is recorded, or a computer in which such a program can be installed.

Modification Example of Frame

FIG. 17 is a diagram illustrating a modification example of the frame. A frame 133 shown in FIG. 17 includes three aperture regions 133A to 133C. The respective aperture regions 133A to 133C are regions that have a central angle of 120° and have the same area. The above-mentioned frame 132 includes four aperture regions 132A to 132D, and the aperture region 132D is closed by the shielding member B. Accordingly, the frame 133 including three aperture regions 133A to 133C in advance may be used. Aspects other than the above-mentioned examples may also be employed as the shape of the frame, the number of aperture regions, and the shapes of the aperture regions.

Modification Examples of Wavelength Polarizing Filter Unit

FIGS. 18A, 18B, 18C, and 18D are diagrams showing modification examples of the wavelength polarizing filter unit 130. FIGS. 18A, 18B, 18C, and 18D show the wavelength ranges (λ1, λ2, and λ3) of optical filters disposed in the respective aperture regions and the polarization directions (0°, 60°, and 120°) of polarizing filters.

Figure 18D:
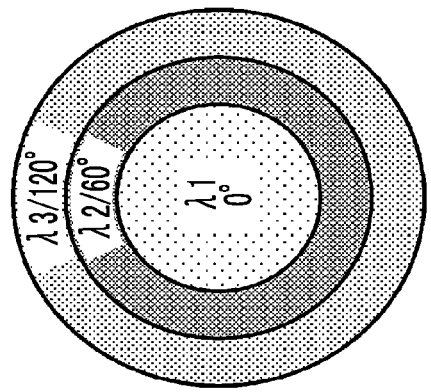
FIGS. 18A, 18B, 18C, and 18D are diagrams showing modification examples of the wavelength polarizing filter unit.
Figure 18C:
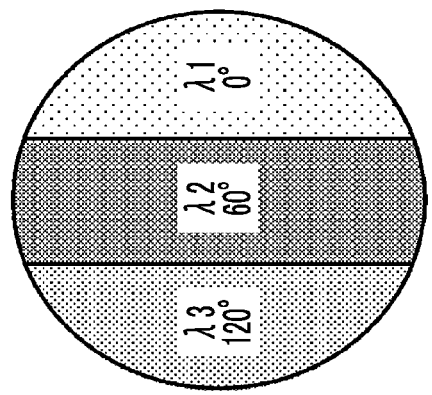
Figure 18B:
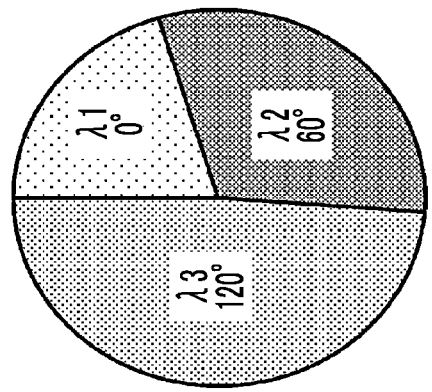
Figure 18A:
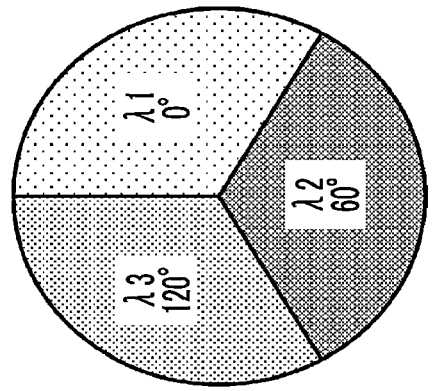

In a wavelength polarizing filter unit 130 shown in FIG. 18A, each of three aperture regions has a fan shape having a central angle of 120°. In a case where the shapes of the aperture regions are uniformly set to a fan shape having a central angle of 120° in this way, the areas of the three aperture regions can be made uniform. In a wavelength polarizing filter unit 130 shown in FIG. 18B, the central angle of an aperture region corresponding to the wavelength range λ3 is 180°, an aperture region corresponding to the wavelength range λ2 has a central angle of 120°, and an aperture region corresponding to the wavelength range λ1 has a central angle of 60°. In this way, the area of an aperture region may be changed depending on an aperture region. In a wavelength polarizing filter unit 130 shown in FIG. 18C, the shape of each aperture region is set to a rectangular strip shape. An aperture region having a rectangular strip shape and corresponding to the wavelength range λ3 is provided on the left side in FIG. 18C, an aperture region having a rectangular strip shape and corresponding to the wavelength range λ2 is provided in the middle, and an aperture region having a rectangular strip shape and corresponding to the wavelength range λ1 is provided on the right side in FIG. 18C. As described above, the aperture region can employ not only a fan shape but also various shapes. In a wavelength polarizing filter unit 130 shown in FIG. 18D, an aperture region corresponding to each wavelength range is formed in a concentric circular shape. Specifically, an aperture region corresponding to the wavelength range λ1 is a circular region closest to the center, an aperture region corresponding to the wavelength range λ2 is provided outside the circular region closest to the center, and an aperture region corresponding to the wavelength range λ3 is provided on the outermost side. As described above, the aperture region can employ not only a fan shape but also various shapes.

Second Embodiment

Next, a second embodiment will be described. In this embodiment, a quarter wavelength plate (first circularly polarizing optical element) 146 is disposed in each of aperture regions 132A to 132C of a frame 132.

Figure 19:
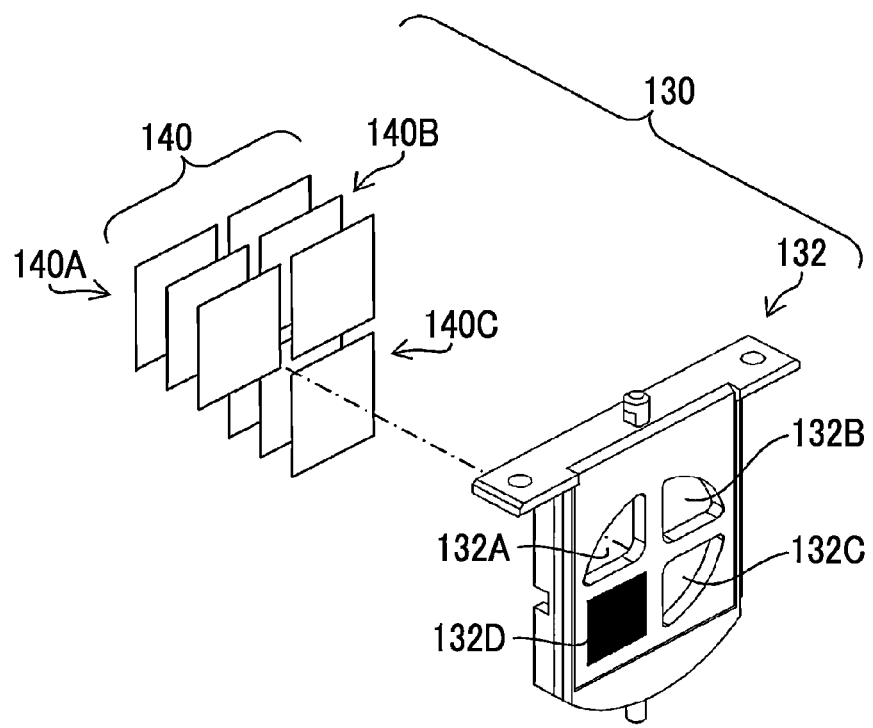
FIG. 19 is a conceptual diagram showing the wavelength polarizing filter unit of this embodiment.

FIG. 19 is a diagram showing a configuration example of a wavelength polarizing filter unit 130 of this embodiment.

A filter set 140 of the wavelength polarizing filter unit 130 includes three components, that is, an optical filter 142, a polarizing filter 144, and a quarter wavelength plate 146. Specifically, each of a filter set 140A corresponding to the aperture region 132A, a filter set 140B corresponding to the aperture region 132B, and a filter set 140C corresponding to the aperture region 132C includes three components, that is, an optical filter 142, a polarizing filter 144, and a quarter wavelength plate 146.

Figure 20:
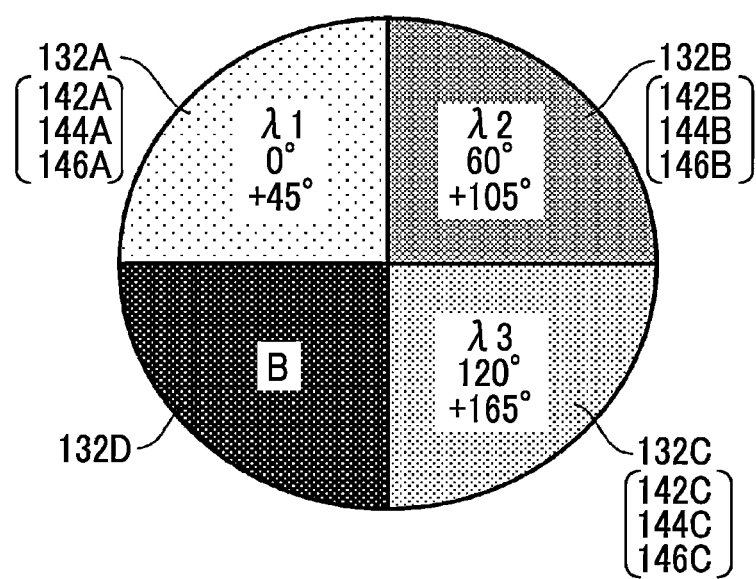
FIG. 20 is a conceptual diagram showing the wavelength polarizing filter unit of this embodiment.

FIG. 20 is a conceptual diagram showing the wavelength polarizing filter unit 130 of this embodiment.

The filter set 140A is disposed in the aperture region 132A. The filter set 140A has a configuration in which a quarter wavelength plate 146A disposed to have an optical axis corresponding to +45°, an optical filter 142A transmitting light having the wavelength range λ1, and a polarizing filter 144A disposed to have a polarization direction of 0° are arranged from the subject side. The filter set 140B is disposed in the aperture region 132B. The filter set 140B has a configuration in which a quarter wavelength plate 146B disposed to have an optical axis corresponding to +105°, an optical filter 142B transmitting light having the wavelength range λ2, and a polarizing filter 144B disposed to have a polarization direction of 60° are arranged from the subject side. The filter set 140C is disposed in the aperture region 132C. The filter set 140C has a configuration in which a quarter wavelength plate 146C disposed to have an optical axis corresponding to +165°, an optical filter 142C transmitting light having the wavelength range λ3, and a polarizing filter 144C disposed to have a polarization direction of 120° are arranged from the subject side. A shielding member B is disposed in an aperture region 132D.

Figure 21:
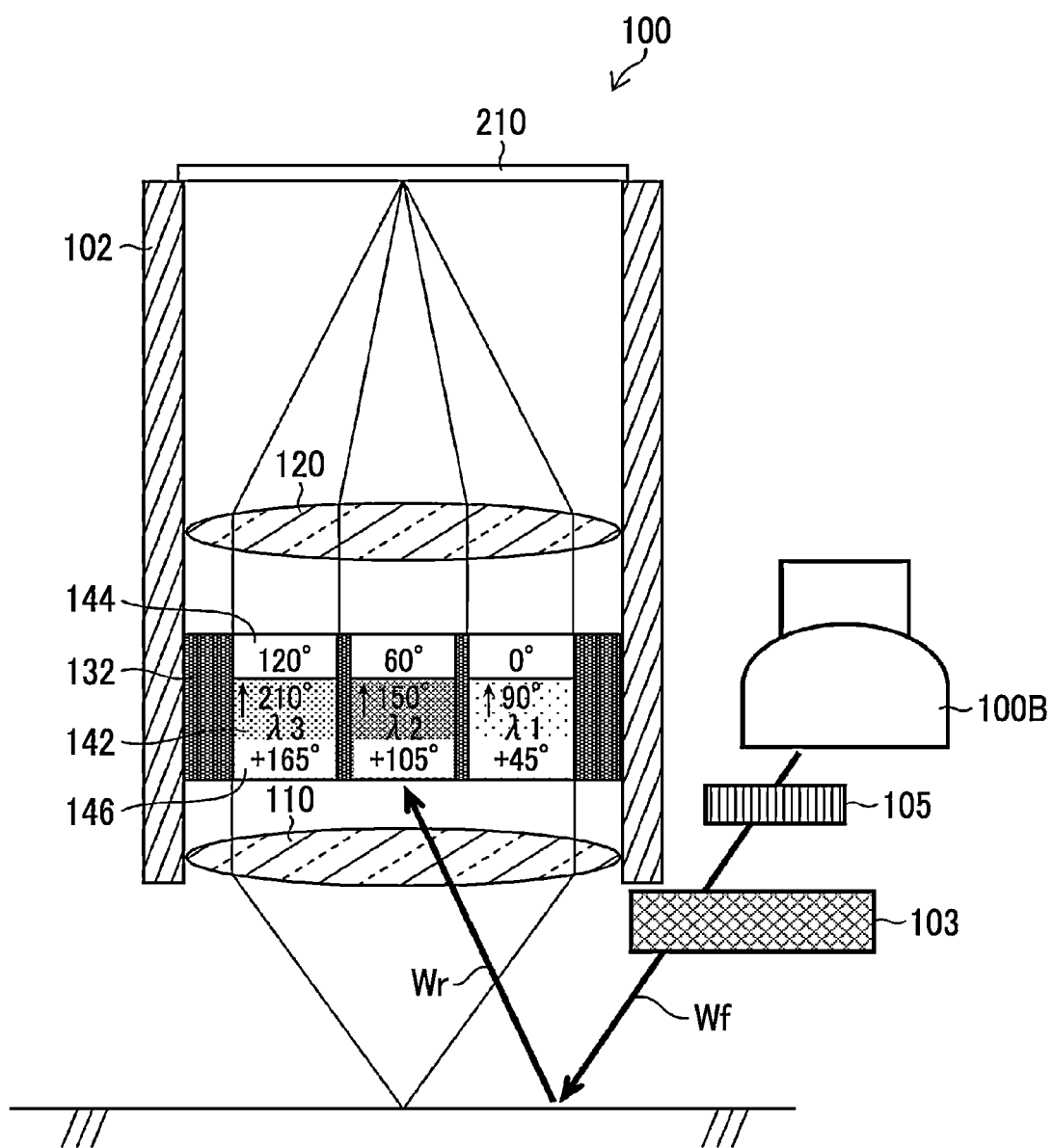
FIG. 21 is a diagram illustrating Specific example 1 of this embodiment.

FIG. 21 is a diagram illustrating Specific example 1 of this embodiment.

Quarter wavelength plates (146A to 146C) (first circularly polarizing optical elements) are provided in the respective aperture regions 132A to 132C on the subject side of the frame 132. The quarter wavelength plates 146A to 146C may be provided integrally with the wavelength polarizing filter unit 130 or may be provided separately. In a case where the quarter wavelength plates 146A to 146C are provided separately from the wavelength polarizing filter unit 130, the quarter wavelength plates 146A to 146C are provided closer to the subject side than the wavelength polarizing filter unit 130.

In the example shown in FIG. 21, the polarizing filter 105 is disposed to have a polarization direction of 0°. Further, the quarter wavelength plate 103 is disposed to have an optical axis corresponding to +45°.

Illumination light Wf of natural light, which is emitted from the illumination device 100B, is transmitted through the polarizing filter 105 and is converted into linearly polarized light having a polarization direction of 0°. After that, the illumination light Wf is converted into clockwise circularly polarized light by being transmitted through the quarter wavelength plate 103, and is reflected by a subject. Totally reflected light Wr is converted into counterclockwise circularly polarized light, and is incident on the quarter wavelength plates 146A to 146C provided in the respective aperture regions 132A to 132C. Specifically, in a case where the totally reflected light Wr is transmitted through the quarter wavelength plate 146A provided to have an optical axis corresponding to +45°, the totally reflected light Wr is converted into linearly polarized light having a polarization direction of 90° in the aperture region 132A. Further, since the polarizing filter 144A has a polarization direction of 0° and the polarization direction of the totally reflected light Wr of linearly polarized light having a polarization direction of 90° and the polarization direction of the polarizing filter 144A are different from each other by 90°, the totally reflected light Wr of linearly polarized light having a polarization direction of 90° is blocked in the aperture region 132A. Likewise, in a case where the totally reflected light Wr is transmitted through the quarter wavelength plate 146B provided to have an optical axis corresponding to +105°, the totally reflected light Wr is converted into linearly polarized light having a polarization direction of 150° in the aperture region 132B. Further, since the polarizing filter 144B has a polarization direction of 60° and the polarization direction of the totally reflected light Wr of linearly polarized light having a polarization direction of 150° and the polarization direction of the polarizing filter 144B are different from each other by 90°, the totally reflected light Wr of linearly polarized light having a polarization direction of 150° is blocked in the aperture region 132B. Likewise, in a case where the totally reflected light Wr is transmitted through the quarter wavelength plate 146C provided to have an optical axis corresponding to +165°, the totally reflected light Wr is converted into linearly polarized light having a polarization direction of 210° in the aperture region 132C. Further, since the polarizing filter 144C has a polarization direction of 120° and the polarization direction of the totally reflected light Wr of linearly polarized light having a polarization direction of 210° and the polarization direction of the polarizing filter 144C are different from each other by 90°, the totally reflected light Wr of linearly polarized light having a polarization direction of 210° is blocked in the aperture region 132C.

As described above, in this embodiment, the totally reflected light Wr is blocked by the polarizing filters 144A to 144C in the respective aperture regions 132A to 132C. Accordingly, the totally reflected light Wr does not reach the imaging element 210 and the occurrence of overexposure can be suppressed in this embodiment.

Third Embodiment

Next, a third embodiment will be described. In this embodiment, illumination light Wf is transmitted through the lens barrel 102 and a subject is illuminated using coaxial epi-illumination.

Figure 22:
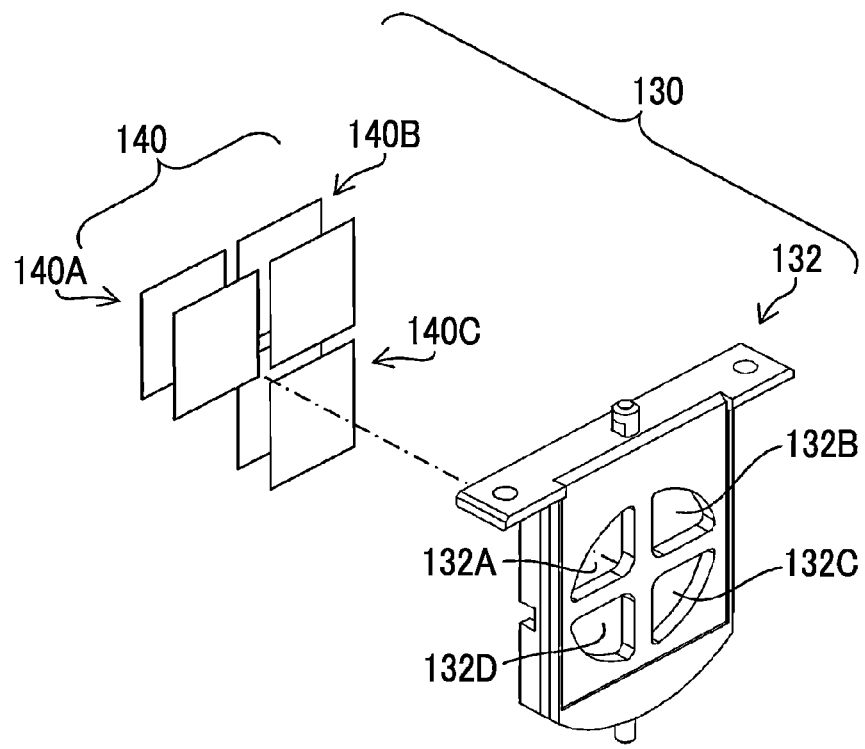
FIG. 22 is a diagram showing a configuration example of the wavelength polarizing filter unit of this embodiment.

FIG. 22 is a diagram showing a configuration example of a wavelength polarizing filter unit 130 of this embodiment.

An aperture region 132D of the wavelength polarizing filter unit 130 is blank. Specifically, the aperture region 132D is a region that does not include a shielding member B, a filter set 140, or the like and allows the illumination light Wf to pass therethrough.

Figure 23:
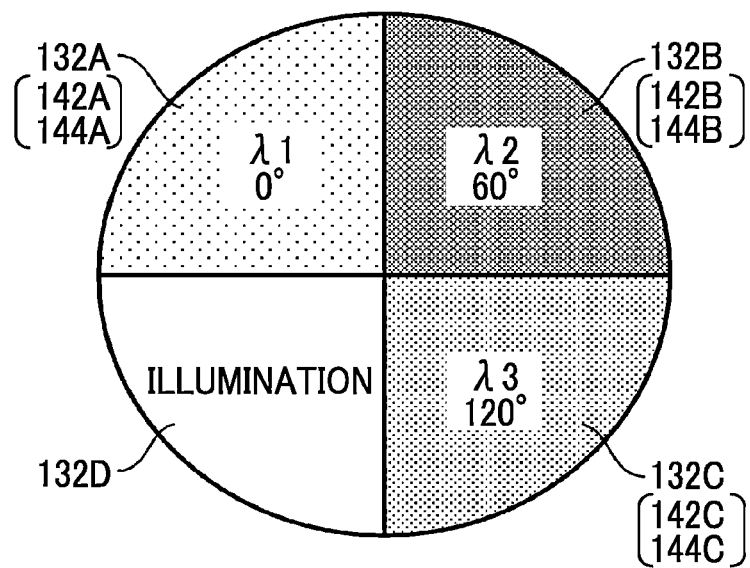
FIG. 23 is a conceptual diagram showing the wavelength polarizing filter unit of this embodiment.

FIG. 23 is a conceptual diagram showing the wavelength polarizing filter unit 130 of this embodiment. The same portions as those shown in FIG. 11 are denoted by the same reference numerals as those shown in FIG. 11, and the description thereof will be omitted.

The wavelength polarizing filter unit 130 includes the aperture regions 132A to 132D. A filter set 140 is disposed in each of the aperture regions 132A to 132C. On the other hand, the aperture region 132D is blank to transmit the illumination light Wf. The aperture region 132D may be provided with a filter not affecting the illumination light Wf, for example, a transparent filter or the like.

Figure 24:
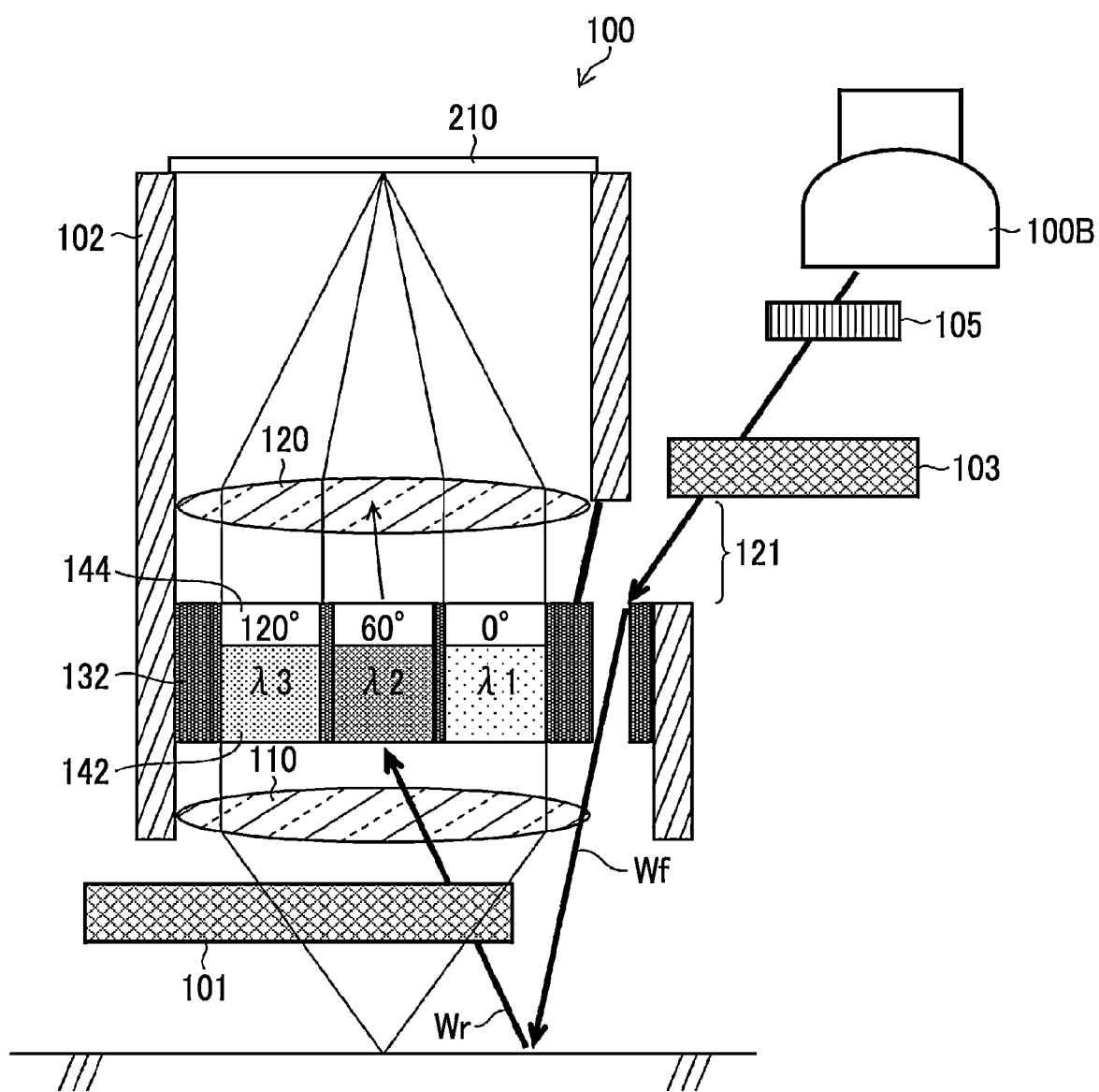
FIG. 24 is a diagram showing Specific example 1 of this embodiment.

FIG. 24 is a diagram showing Specific example 1 of this embodiment.

In the example shown in FIG. 24, a polarizing filter 105 is disposed to have a polarization direction (polarization axis) of 0°. Further, a quarter wavelength plate 103 is disposed to have an optical axis corresponding to +45°. Furthermore, a quarter wavelength plate 101 is disposed to have an optical axis corresponding to +45°.

Illumination light Wf of natural light, which is emitted from the illumination device 100B, is transmitted through the polarizing filter 105 and is converted into linearly polarized light having a polarization direction of 0°. After that, the illumination light Wf is converted into clockwise circularly polarized light by being transmitted through the quarter wavelength plate 103. A lens barrel 102 of a lens device 100 is provided with an illumination light-insertion portion 121. The illumination light Wf enters the lens barrel 102 from the illumination light-insertion portion 121, and reaches a subject through the aperture region 132D. The subject is irradiated with the illumination light Wf through the inside of the lens barrel 102 in this way, so that coaxial epi-illumination is provided.

The quarter wavelength plate 101 is disposed to have an optical axis corresponding to β°. Accordingly, in a case where totally reflected light Wr is transmitted through the quarter wavelength plate 101, the totally reflected light Wr is converted into linearly polarized light having a polarization direction of (β+45°). (β+45°) is different from the polarization directions (0°, 60°, and 120°) of the polarizing filters 144A to 144C. Accordingly, the totally reflected light Wr is dimmed due to a difference between the polarization direction of the totally reflected light Wr and the polarization direction of the polarizing filter 144 and reaches the imaging element 210. Further, in a case where the polarization direction of (β+45°) of the totally reflected light Wr and the polarization direction of the polarizing filter 144 are orthogonal to each other, the totally reflected light Wr is blocked and does not reach the imaging element 210.

As described above, in this example, the illumination light Wf emitted from the illumination device 100B is transmitted through the polarizing filter 105 and the quarter wavelength plate 103 and enters the lens barrel 102 from the illumination light-insertion portion 121. Then, the subject is illuminated with the illumination light Wf by coaxial epi-illumination.

Figure 25:
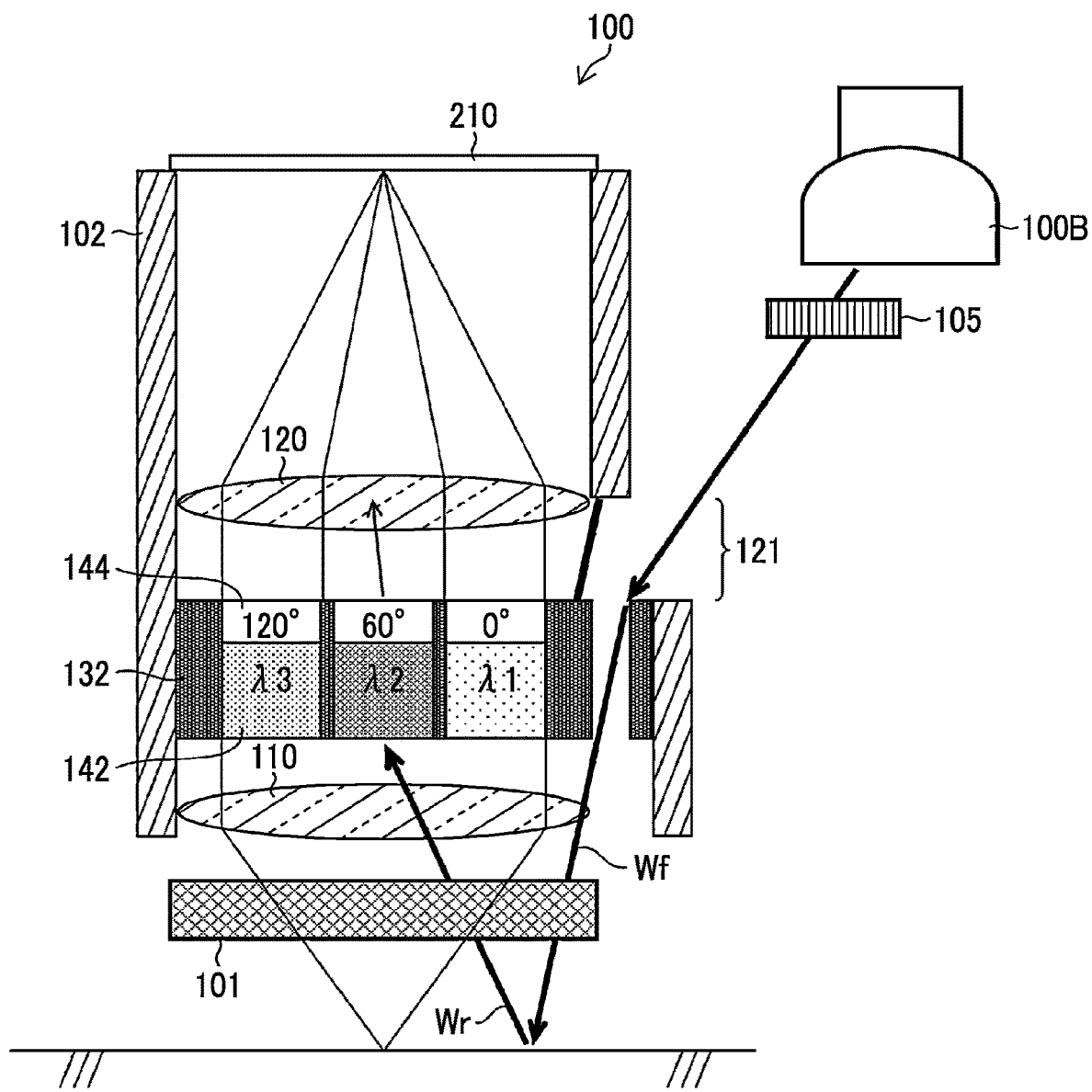
FIG. 25 is a diagram showing Specific example 2 of this embodiment.

FIG. 25 is a diagram showing Specific example 2 of this embodiment.

In the example shown in FIG. 25, a polarizing filter 105 is disposed to have a polarization direction (polarization axis) of 0°. Further, a quarter wavelength plate 101 is disposed to have an optical axis corresponding to 45° and to transmit illumination light Wf and totally reflected light Wr.

Illumination light Wf of natural light, which is emitted from the illumination device 100B, is transmitted through the polarizing filter 105 disposed to have a polarization direction of 0° and is converted into illumination light Wf including linearly polarized light. The illumination device 100B (second illumination device) of this example comprises the polarizing filter 105. A lens barrel 102 of a lens device 100 is provided with an illumination light-insertion portion 121. The illumination light Wf including linearly polarized light enters the lens barrel 102 from the illumination light-insertion portion 121, and passes through the aperture region 132D. After that, the illumination light Wf is transmitted through the quarter wavelength plate 101 disposed to have an optical axis corresponding to +45°, is converted into clockwise circularly polarized light, and is reflected by the surface of the subject. The totally reflected light Wr is converted into counterclockwise circularly polarized light and is transmitted through the quarter wavelength plate 101 disposed to have an optical axis corresponding to +45°. In a case where the totally reflected light Wr is transmitted through the quarter wavelength plate 101, the totally reflected light Wr is converted into linearly polarized light having a polarization direction of 90°. Accordingly, the totally reflected light Wr is dimmed or blocked due to a difference between the polarization direction of each of the polarizing filters 144A to 144C and the polarization direction (90°) of the totally reflected light Wr. Specifically, since the polarizing filter 144A having a polarization direction of 0° is provided in the aperture region 132A, a difference between the polarization direction of the polarizing filter 144A and the polarization direction (90°) of the totally reflected light Wr is 90°. As a result, the totally reflected light Wr is blocked. Further, since the polarizing filter 144B having a polarization direction of 60° is provided in the aperture region 132B, a difference between the polarization direction of the polarizing filter 144B and the polarization direction (90°) of the totally reflected light Wr is 30°. As a result, the totally reflected light Wr is dimmed. Furthermore, since the polarizing filter 144C having a polarization direction of 120° is provided in the aperture region 132C, a difference between the polarization direction of the polarizing filter 144C and the polarization direction (90°) of the totally reflected light Wr is 30°. As a result, the totally reflected light Wr is dimmed.

As described above, in this example, the illumination light Wf emitted from the illumination device 100B is transmitted through the polarizing filter 105 and enters the lens barrel 102 from the illumination light-insertion portion 121. Then, the subject is illuminated with the illumination light Wf by coaxial epi-illumination.

FIGS. 26A, 26B, and 26C are diagrams showing modification examples of the wavelength polarizing filter unit 130 of this embodiment. FIGS. 26A, 26B, and 26C show the wavelength ranges (λ1, λ2, and λ3) of the optical filters disposed in the respective aperture regions, the polarization directions (0°, 60°, and 120°) of the polarizing filters, and illumination regions (illumination).

In FIG. 26A, the illumination region is disposed on the outer periphery of three aperture regions that have a central angle of 120° and are formed in a fan shape. Since the illumination region is disposed as described above, illumination is formed as ring illumination and the subject can be illuminated uniformly. In FIG. 26B, the illumination region is disposed at a part of the aperture regions provided in a rectangular strip shape. Since the illumination region is disposed at a part as described above, a part of the subject can be illuminated intensively. In FIG. 26C, the illumination region is disposed on the outermost peripheral side of each filter having a concentric circular shape. Since the illumination regions are disposed as described above, illumination is formed as ring illumination and the subject can be illuminated uniformly. The illumination light Wf may pass through the inside of an imaging optical path or pass through the outside thereof.

The embodiments of the present invention have been described above, but it goes without saying that the present invention is not limited to the above-mentioned embodiments and may have various modifications without departing from the scope of the present invention.

EXPLANATION OF REFERENCES

10: imaging apparatus
100: lens device
100A: optical system
100B: illumination device
101: quarter wavelength plate
102: lens barrel
103: quarter wavelength plate
105: polarizing filter
108: slit
110: first lens
120: second lens
130: wavelength polarizing filter unit
132, 133: frame
140: filter set
142: optical filter
144: polarizing filter
146: quarter wavelength plate
200: imaging apparatus body
210: imaging element
230: signal processing unit
232: analog signal processing unit
234: image generation unit
236: coefficient storage unit
310: light source controller
320: light source
B: shielding member
L: optical axis

What is claimed is:

1. A lens device comprising:
an optical system that includes a lens forming an optical image of a subject;
a wavelength polarizing filter unit that is disposed at a pupil position of the optical system or near the pupil position and includes a plurality of aperture regions, a plurality of optical filters that are disposed in the plurality of aperture regions and include two or more optical filters transmitting lights having at least a part of wavelength ranges different from each other, and a plurality of first polarizing filters that are disposed in the plurality of aperture regions and are at least two first polarizing filters having polarization directions different from each other; and
a first circularly polarizing optical element that is provided between the subject and the wavelength polarizing filter unit.

2. The lens device according to claim 1,
wherein the first circularly polarizing optical element converts illumination light of circularly polarized light, which is totally reflected by the subject, into linearly polarized light that has a polarization direction different from the polarization directions of the respective first polarizing filters.

3. The lens device according to claim 1,
wherein an optical axis of the first circularly polarizing optical element is disposed at a position different from the polarization direction of at least one of the first polarizing filters by 45°.

4. The lens device according to claim 1,
wherein the first circularly polarizing optical elements are provided in the optical system and are provided closer to a subject side than the wavelength polarizing filter unit.

5. The lens device according to claim 4,
wherein the first circularly polarizing optical elements are provided integrally with the wavelength polarizing filter unit.

6. The lens device according to claim 4,
wherein the wavelength polarizing filter unit includes the first circularly polarizing optical elements that are provided in the aperture regions and have optical axes different from each other, and
the optical axis of each first circularly polarizing optical element is disposed at a position different from the polarization direction of the first polarizing filter provided in the corresponding aperture region by 45°.

7. The lens device according to claim 1,
wherein the first polarizing filters are provided in the aperture regions of the wavelength polarizing filter unit such that the polarization directions of the first polarizing filters have an interval of 60°.

8. The lens device according to claim 1,
wherein at least one of the aperture regions of the wavelength polarizing filter unit includes the aperture region that allows illumination light to pass therethrough.

9. An imaging apparatus comprising:
the lens device according to claim 8;
a second polarizing filter that converts illumination light of natural light into linearly polarized light;
a first illumination device that includes a second circularly polarizing optical element converting illumination light, which includes the linearly polarized light transmitted through the second polarizing filter, into circularly polarized light; and
an imaging element that includes a plurality of polarizing elements having polarization directions different from each other and a plurality of pixel groups selectively receiving light transmitted through any one of the plurality of aperture regions,
wherein at least one of the aperture regions of the lens device transmits illumination light of the circularly polarized light from the first illumination device.

10. The lens device according to claim 1, further comprising:
a second circularly polarizing optical element that converts illumination light into illumination light of circularly polarized light.

11. The lens device according to claim 10,
wherein the first circularly polarizing optical elements are provided integrally with the second circularly polarizing optical element.

12. An imaging apparatus comprising:
the lens device according to claim 10;
a second illumination device that includes a second polarizing filter converting illumination light of natural light into linearly polarized light; and
an imaging element that includes a plurality of polarizing elements having polarization directions different from each other and a plurality of pixel groups selectively receiving light transmitted through any one of the plurality of aperture regions,
wherein at least one of the aperture regions of the lens device transmits illumination light of the linearly polarized light from the second illumination device.

13. An imaging apparatus comprising:
the lens device according to claim 1;
a second polarizing filter that converts illumination light of natural light into linearly polarized light;
a first illumination device that includes a second circularly polarizing optical element converting illumination light, which includes the linearly polarized light transmitted through the second polarizing filter, into circularly polarized light; and
an imaging element that includes a plurality of polarizing elements having polarization directions different from each other and a plurality of pixel groups selectively receiving light transmitted through any one of the plurality of aperture regions.

14. An imaging method using the imaging apparatus according to claim 13, the imaging method comprising:
a step of transmitting illumination light, which is reflected by the subject, through the first circularly polarizing optical element.

* * * * *